(12) United States Patent
Powell et al.

(10) Patent No.: US 7,186,004 B2
(45) Date of Patent: Mar. 6, 2007

(54) HOMOGENIZING OPTICAL SHEET, METHOD OF MANUFACTURE, AND ILLUMINATION SYSTEM

(76) Inventors: Karlton David Powell, 3109-125Th Ave. NE., Lake Stevens, WA (US) 98258; Mircea Michael Bayer, 18461-47Th Pl. NE., Seattle, WA (US) 98155

( * ) Notice: Subject to any disclaimer, the term of this patent is extended or adjusted under 35 U.S.C. 154(b) by 147 days.

(21) Appl. No.: 10/748,618

(22) Filed: Dec. 30, 2003

(65) Prior Publication Data
US 2004/0156130 A1    Aug. 12, 2004

Related U.S. Application Data

(60) Provisional application No. 60/437,657, filed on Dec. 31, 2002.

(51) Int. Cl.
*F21V 5/00* (2006.01)
(52) U.S. Cl. ............... 362/244; 362/268; 362/331; 362/333; 362/335; 359/365; 359/621
(58) Field of Classification Search ........... 362/344, 362/459, 607, 333, 335, 268, 244, 331; 359/365, 359/621
See application file for complete search history.

(56) References Cited

U.S. PATENT DOCUMENTS 4,924,356 A   5/1990  French et al. ............... 362/31
5,499,120 A   3/1996  Hansen ....................... 359/48
5,816,681 A   10/1998 Tedesco ....................... 362/80
5,956,163 A * 9/1999  Clarke et al. ............... 358/509
6,363,603 B1  4/2002  Nemoto et al. ............. 29/458
6,411,439 B2  6/2002  Nishikawa ................... 359/619
2002/0093743 A1* 7/2002 Miyamae et al. ........... 359/619

\* cited by examiner

*Primary Examiner*—Stephen F Husar
*Assistant Examiner*—Meghan K. Dunwiddie

(57) ABSTRACT

An optical sheet that accepts light transmitted at or within a specific entrance cone angle that then redirects and transmits the light within an exit cone that is substantially normal to the sheet's plane. The intensity of the light within the exit cone is substantially uniform for any light source entering the sheet within the sheet's acceptance angle. The optical sheet is made of transparent material with microlens arrays formed on its opposite front and back surfaces. The thickness of the optical sheet is sufficient so that the microlens on the opposite surfaces are separated a distance equal to the microlens focal length, with each microlens on the front and back surfaces having substantially similar size and shape, with centers transversely aligned. When used with one or more light sources located on one surface, the transmitted light through the optical sheet is uniform in intensity across a second surface. When used with a second optical sheet, aligned parallel to the first optical sheet, the transmitted light is uniform across and throughout angles within the exit cone at a second surface. An economical method of manufacturing the optical sheet is also provided.

5 Claims, 28 Drawing Sheets

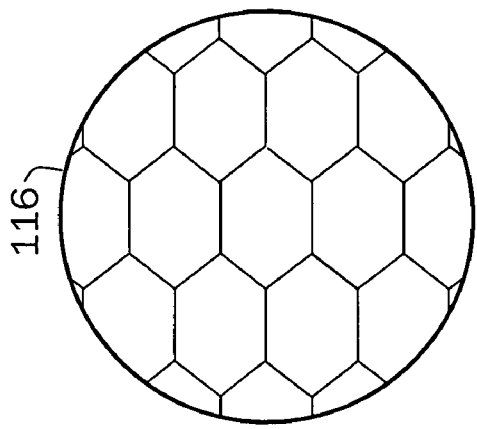
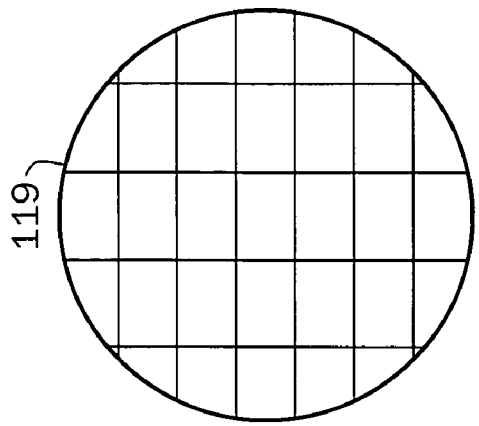
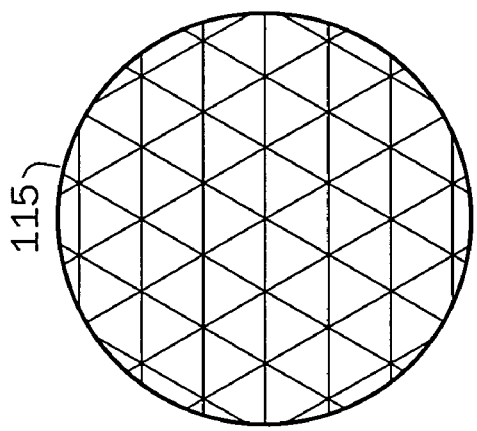
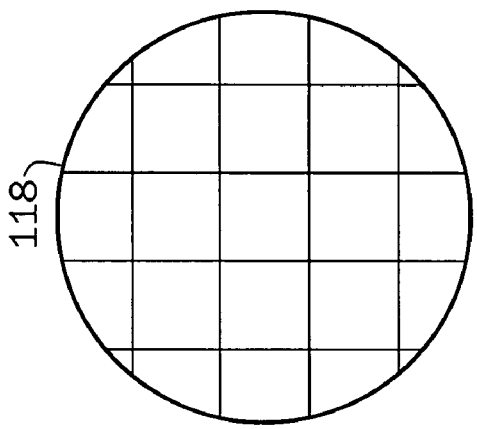
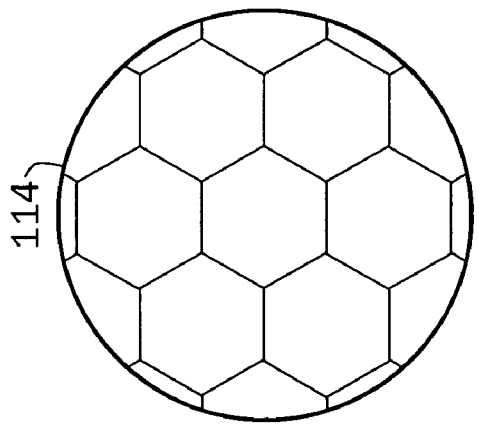
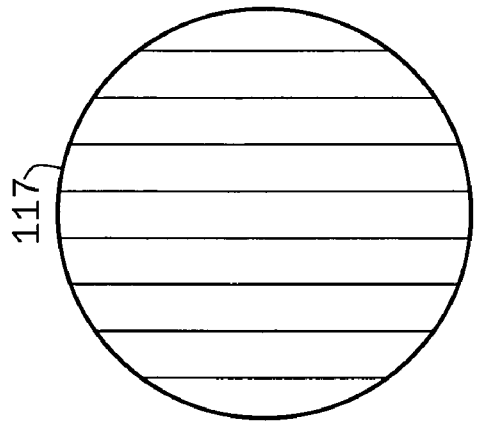
Fig. 5

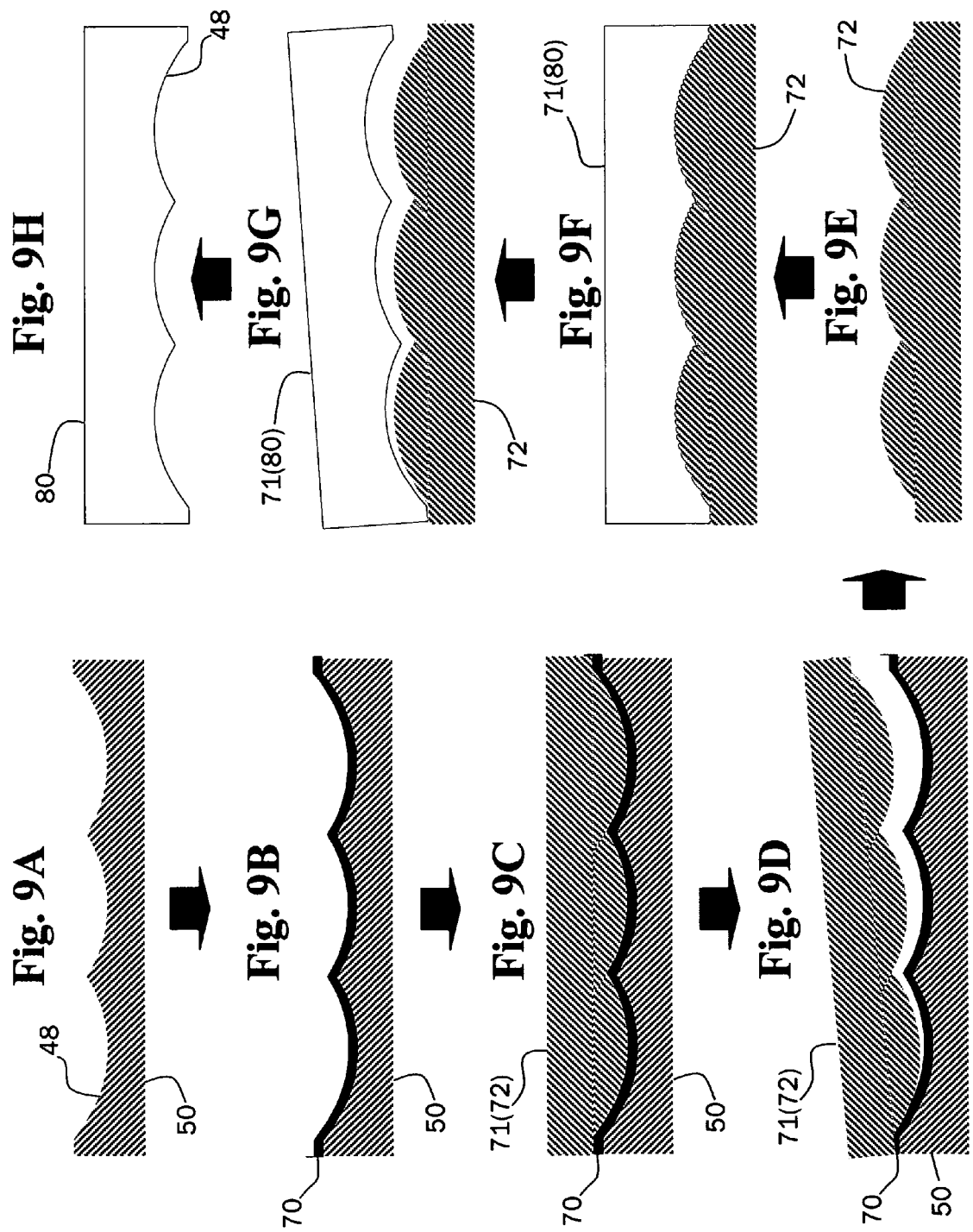

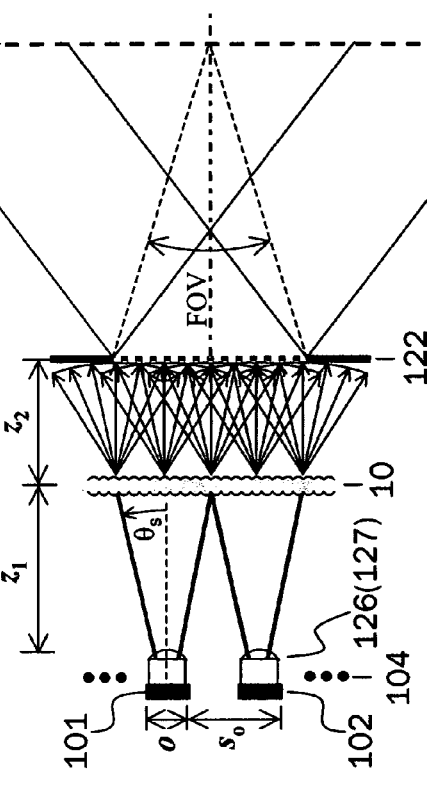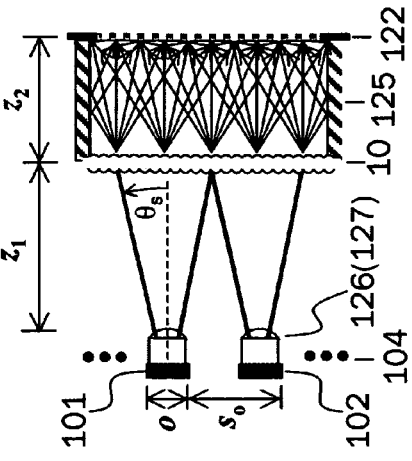
Fig. 12A
Fig. 12D
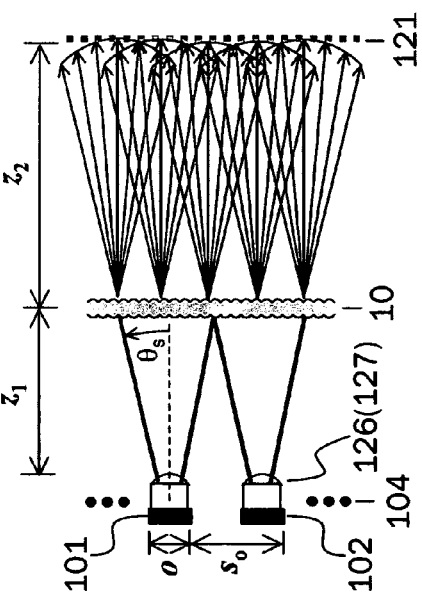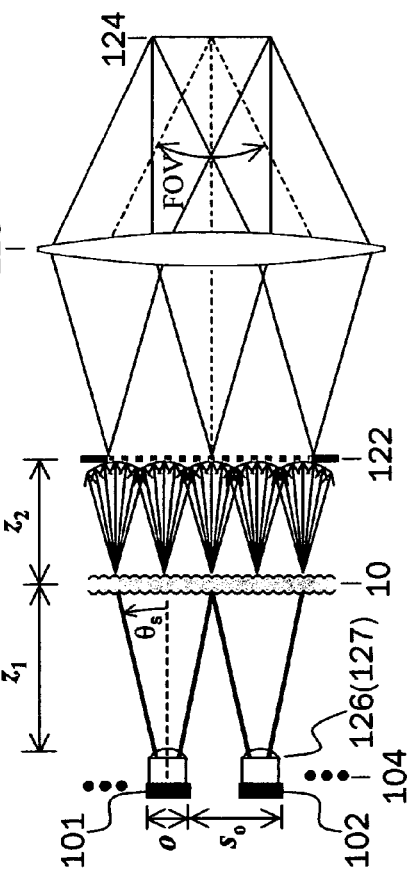
Fig. 12B
Fig. 12C

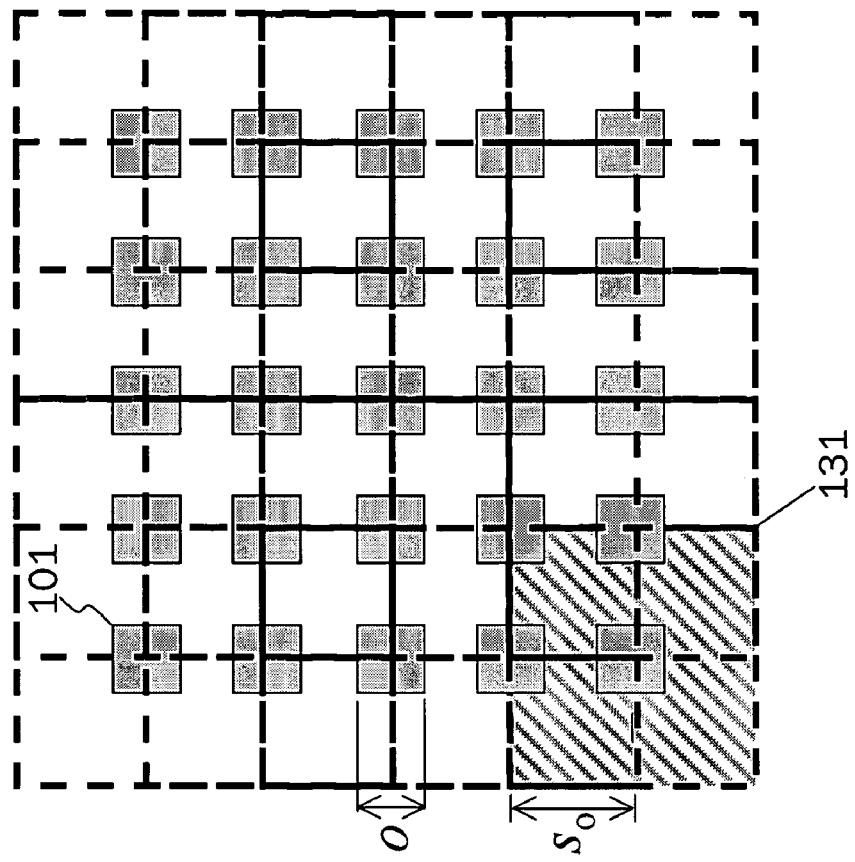
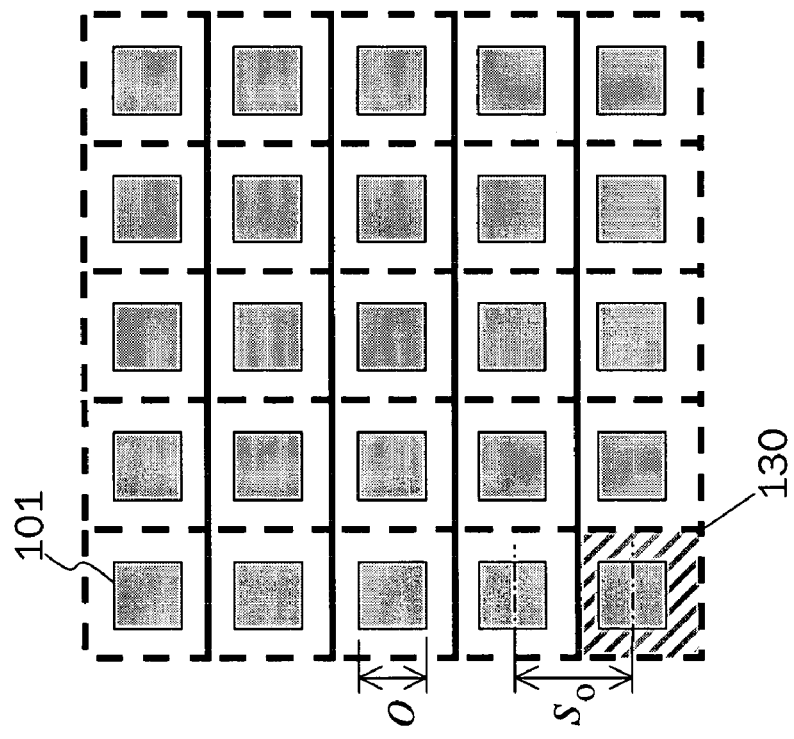

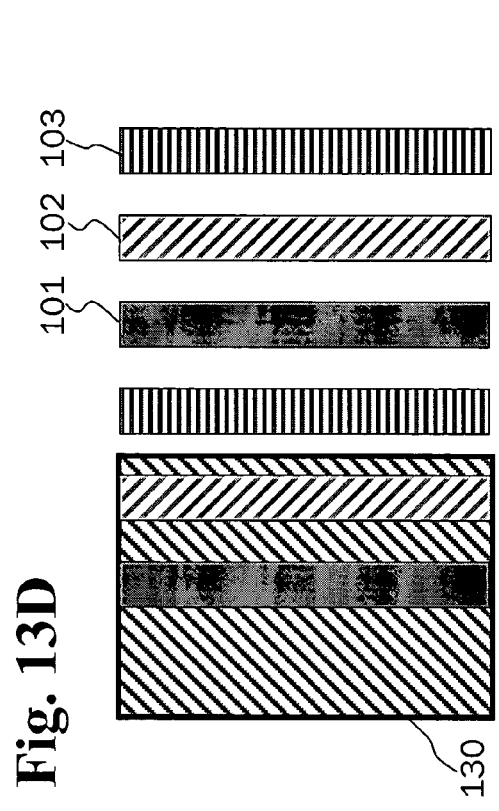
Fig. 13C
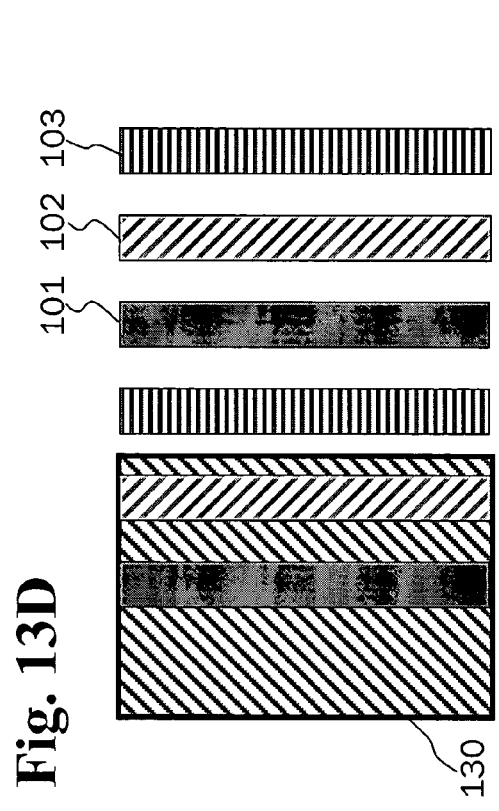
Fig. 13D
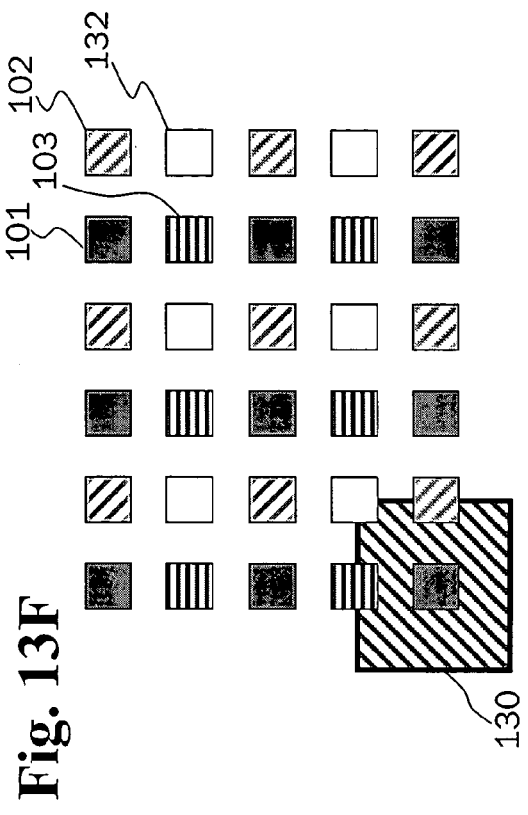
Fig. 13E
Fig. 13F

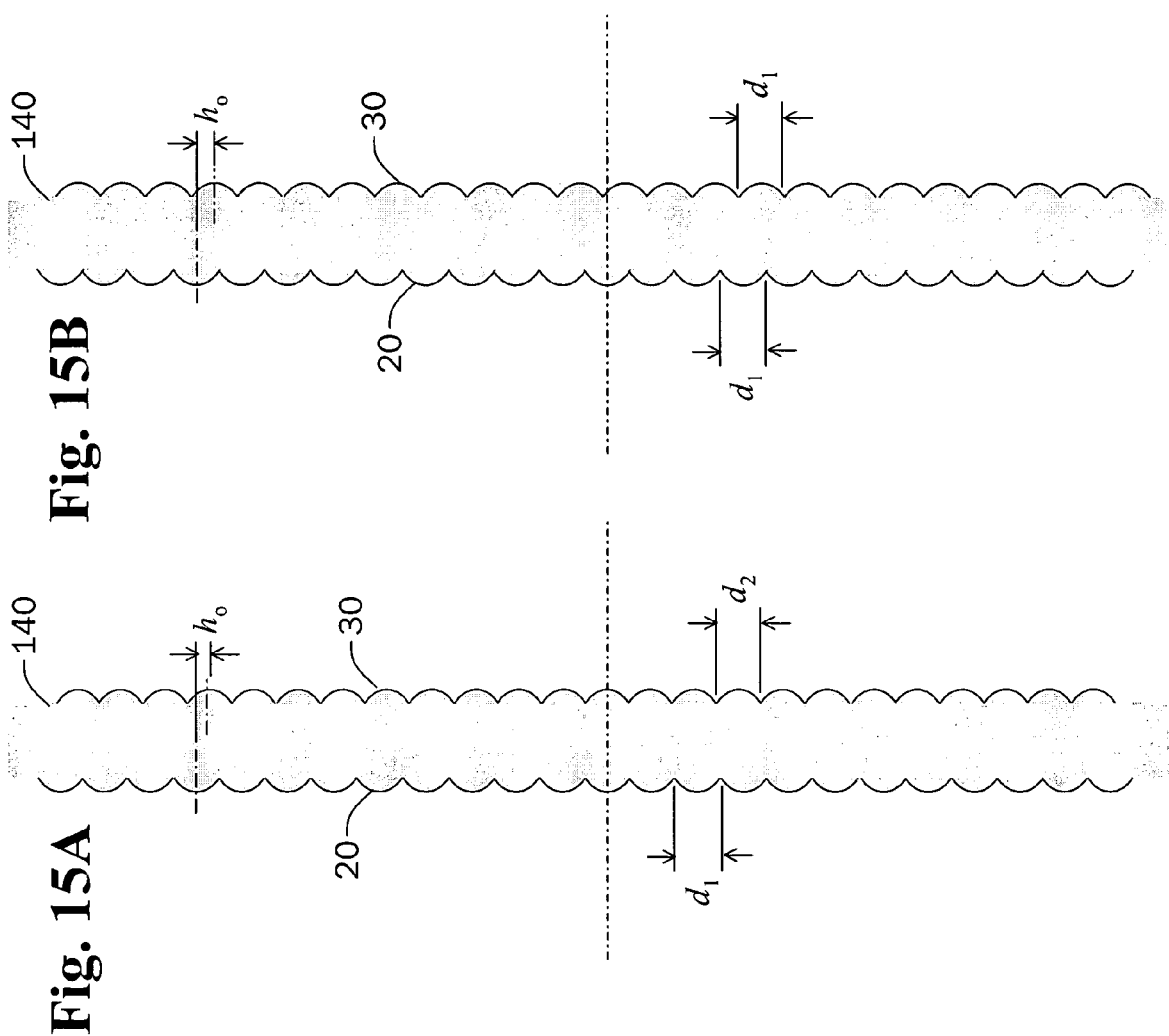

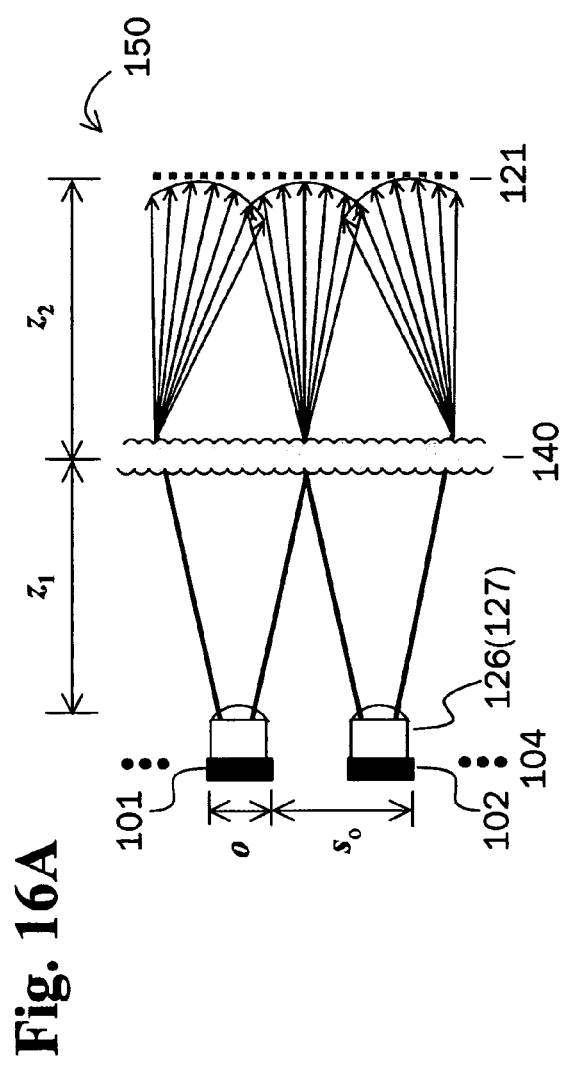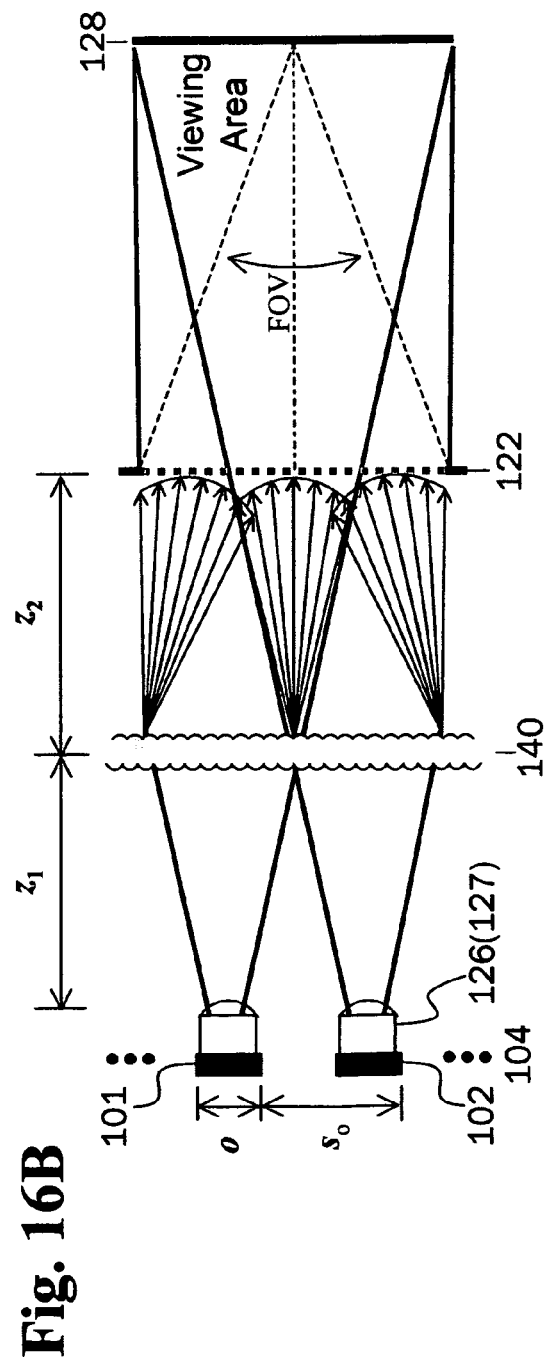
Fig. 16A
Fig. 16B

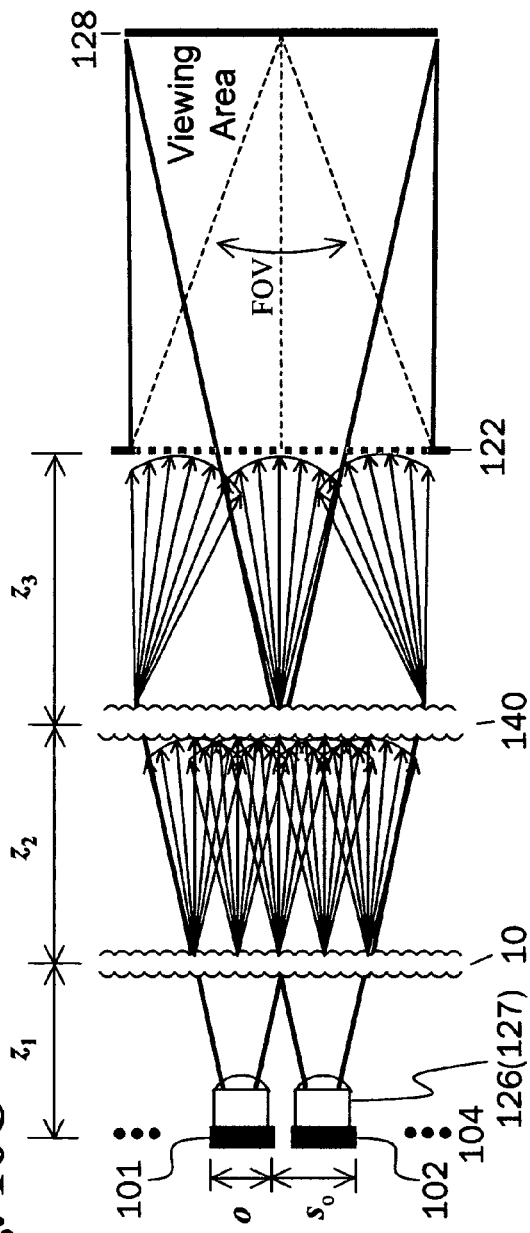
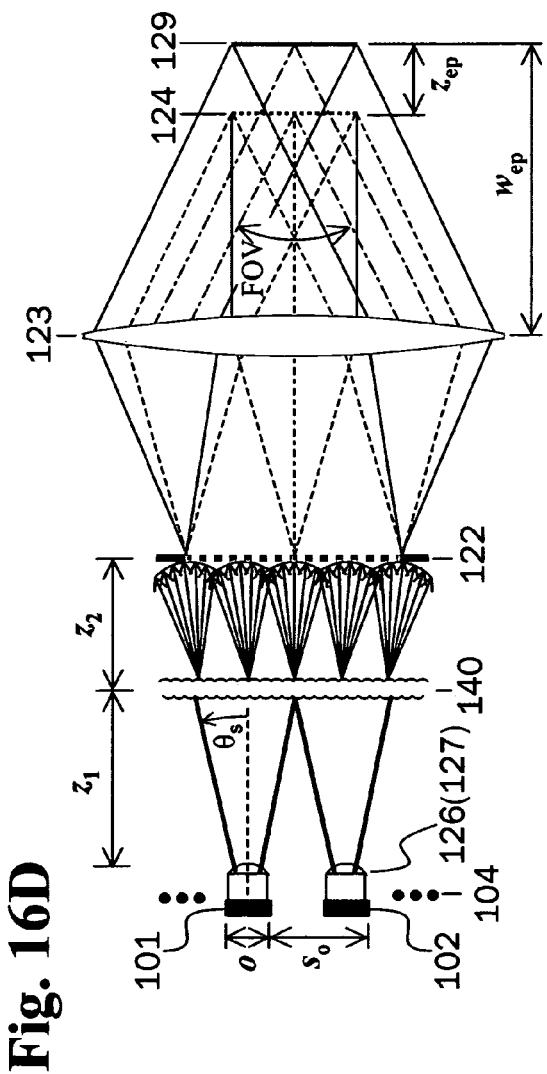
Fig. 16C
Fig. 16D

HOMOGENIZING OPTICAL SHEET, METHOD OF MANUFACTURE, AND ILLUMINATION SYSTEM

This utility patent application is based on the U.S. provisional patent application (Ser. No. 60/437,657) filed on Dec. 31, 2002.

BACKGROUND OF THE INVENTION

1. Field of the Invention

The present invention relates to a light homogenizing optical sheet used to create uniform light, a method of manufacturing the optical sheet, and a backlight system that uses the optical sheet for a display device.

2. Description of the Related Art

While a variety of solid-state display devices have been developed in the past, Liquid Crystal Displays (LCDs) are attractive due to low cost, reliability, low power and voltage requirements, longevity, and availability. Typical fluorescent backlights have high voltage requirements and relatively short lifespans. In addition, much of the light from fluorescent backlighting exhibits high angular frequencies that can contribute to scatter, potentially reducing display system contrast.

Due to the advantages of solid-state performance, reduced size, low voltage and power requirements, long life, and the increased performance in color gamut, light emitting diodes (LEDs) have gained attention for use in display applications. Arrays of light sources, such as LEDs, have been used in solid-state displays, but typically, a diffuser is positioned adjacent to the LEDs to redistribute the light uniformly across the area of interest. U.S. Pat. No. 5,499,120 discloses an alternative method of diffusing light from the liquid crystal material in a particular Double Super Twisted Nematic cell of a LCD. According to the inventor, the LCD panel provides sufficient light spread such that a diffuser is no longer needed, reducing losses in efficiency caused by the diffuser. However, it should be noted that uniform output at a given distance from an array of sources improves as the sources are spaced at a closer pitch. As price/performance ratios drop with the introduction of new brighter LED sources, it is desirable from a cost standpoint to utilize such sources to minimize the number of source elements needed in a particular application. Due to this, the uniformity of the backlight is an important key to high performance products with low cost. There remains a need for a highly efficient diffuser that can efficiently utilize the light from the array of sources in order to keep costs down and performance high.

U.S. Pat. No. 5,816,681 discloses a system that uses an optical diffuser that can accept light from a source at a specific direction and emit it in a desired viewing direction. The system uses a plurality of LEDs and a holographically recorded optical diffuser with low backscatter and high transmission. Uniform illumination can be utilized in various fields, including the automotive industry and the illumination industry.

Microlens arrays have gained significant interest in backlighting applications. U.S. Pat. No. 4,924,356 discloses a backlight that uses a plurality of microlenses to collimate light emanating through pinholes from a light box. Substantially collimated and uniform backlight can be realized using such a system, however, light efficiency can be affected.

FIG. 1 is an illustration of optical system in the prior art that uses two optical sheets each with a microlens array formed on one surface. The optical sheets are aligned so that the microlens arrays are facing each other and registered. They are spaced apart by the focal length of the lenslet focal length. One drawback with using two optical sheets with microlens arrays formed on one surface is that they must be relatively aligned to a high degree of accuracy, limiting the use of dual MLA homogenizer to high-cost applications having assemblies with more complex mounting techniques in order to align and keep registration. Another drawback is limited acceptance angle that can be achieved, due to Total Internal Reflection (TIR) limitations of the first array. A third drawback is scatter caused by the TIR limitations. A fourth drawback is limited exit angle that can be achieved due to TIR limitations of the first array as well as realistic limitations due to refractive index relationships.

Warren Smith in "Practical Optical System Layout" McGraw-Hill 1997 pages 106–107 illustrates the use of a homogenizer array of microlenses 7 in order to even out the intensity from a projection lamp source 5 collimated by a parabolic mirror 6 so as to illuminate a Dual MLA so that the light seen at the film gate is substantially uniform across the film plane 9 imaged by lens 8, as illustrated in FIG. 1. It should be noted that such a system only allows uniformity versus position across the film plane and does not address uniformity versus angle within the film gate.

In Optical Engineering (vol. 41 no. 10 Oct. 2002 pages 2393–2401), Buttner et al confirms how microlens arrays can be utilized to homogenize light from a single LED source. This paper confirms that microlens arrays can be used in a typical Fourier transform setup such that light from a source diverges, is collimated by a first lens to illuminate a microlens array, then a second Fourier transforming lens is placed such that the microlens array is substantially located at the front focal length of the second lens. The plane at the back focal length of the second lens will then exhibit substantially uniform light. By placing two microlens arrays in tandem spaced apart by the distance of the focal length of a lenslet in the array, the uniformity at the output plane of the system described can be substantially improved. Although not obvious, two opposingly faced microlens arrays in tandem at the focal length separation distance have inherent design limitations on exit Numerical Aperture extent due to the effect of total internal reflection. Light illuminating the first lenslet beyond the critical angle cannot be transmitted toward the second lenslet. In addition, uniformity versus angle at the output plane is not achieved with such system.

A self-limiting isotropic wet etch process is disclosed in U.S. Pat. No. 6,379,573. The publication proposes forming a spherical cavity in a substrate while using tape as an etch mask. It suggests that dimensions of the cavity, such as the radius of curvature, as well as uniformity, can be precisely controlled.

U.S. Pat. No. 6,363,603 discloses a method for manufacturing an erect image of unity magnification, resin lens array by injection molding. The best mode for carrying out the invention includes the step of forming a master by isotropic etching a homogenous substrate through a mask of pinholes. Such a method exhibits high quality results in terms of the accuracy and sharpness at the seams or transition points between lenslets, but the inventors of this present invention have found that substantially isotropic etching can form flat-top profiles at the apex of each lenslet center. Also, substantially aspheric profiles for high numerical aperture lenslets are not possible using the method of isotropic etching through pinholes.

U.S. Pat. No. 6,411,439 discloses a microlens array manufacturing method that involves forming a master, preferably by isotropic etching a homogenous substrate through a resist mask, forming an intermediate master of the original master, forming a duplicate master from the resulting intermediate master, and then forming a microlens array from the duplicate master. It suggests that this method reduces the frequent need of high cost masters thus enabling low cost manufacturing of microlens arrays.

Since high efficiency places some importance on fill factor of the lenslets in a microlens array and high numerical aperture microlens arrays can be desirable for backlighting applications, there is a need for a manufacturing method to achieve both substantially aspheric profiles as well as sharp lenslet seams.

SUMMARY OF THE INVENTION

It is an object of the present invention to provide a single light homogenizing optical sheet that provides uniform intensity across and within an area located within a plane substantially parallel and located after the optical sheet.

It is an object of the present invention to provide such an optical sheet that exhibits lower scatter and allows higher input acceptance angles as well as higher output exit angles than achieved with optical sheets used in the prior art.

It is an object of the present invention to provide such an optical sheet that can be made of flexible material thereby enabling it to be shaped about a substantially curved surface.

It is an object of the present invention to provide such an optical sheet that can be manufactured in a relatively inexpensive manner.

It is another object of the present invention to provide an illumination system that uses one or more of the optical homogenizing sheet so as to provide uniform intensity across and within an area within a plane substantially parallel and located after the optical sheet.

It is a further object of the present invention to provide a display system comprised of at least one light source, at least one optical sheet, and at least one display panel.

These and other objects of the invention are met by an optical sheet disclosed herein designed to accept light transmitted at or within a specific entrance cone that then redirects and transmits the light within an exit cone that is substantially normal to the sheet's plane. The intensity of the light within the exit cone is substantially uniform for any light source entering the sheet within the sheet's acceptance angle.

The optical sheet is made of transparent material with microlens arrays formed on the front and back surfaces of the optical sheet. The microlens arrays are aligned and registered on the front and back surface and separated substantially by the microlens focal length. Each microlens in the two arrays having substantially identical size and shape, with centers transversely aligned with a microlens located on the opposite surface. The thickness of the optical sheet is set such that both microlens array surfaces are separated substantially close to the lenslet focal length, as defined by the profile of the lenslet and the index of refraction of the sheet medium. It should be noted that the homogenizer optical sheet can function for a continuum of wavelengths of visible light as well as ultraviolet, infrared, far-infrared, and other radiation wavelength ranges, depending on the choice of material used to form the sheet. Further, it should be noted that choice of a material exhibiting substantially high transparency and limited dispersion throughout a given spectrum provides for a radiation homogenizing optical sheet that functions substantially consistent for all wavelengths within such wavelength spectrum. For such case, the optical sheet functions substantially independent of wavelength of the source to be homogenized.

In addition to the use of the single homogenizing optical sheet, the inventors have discovered that the use of two homogenizing optical sheets disclosed herein separated by a propagation distance can achieve uniformity at a plane after the last sheet across position as well as through angles within the exit Numerical Aperture exhibited by the sheet. Using two optical sheets, higher uniformity versus position across the sheet as well as higher uniformity versus viewing angle are achieved for high-performance direct display panel viewing applications.

When used with one or more light sources located adjacent on one surface, the transmitted light through the optical sheet is uniform in intensity across a second surface. When used with a second optical sheet, aligned substantially parallel to the first optical sheet, the transmitted light is uniform across and throughout angles within the exit cone at a second surface.

A display system is also provided that uses an optical sheet that includes an array of one or more light sources tiled in a pattern substantially similar yet having pitch equal to or greater than the tiling pattern of the microlens array structure of the optical sheet; and one or more optical sheets, each having opposite microlens array front and back surfaces with the sheets separated by a non-zero distance along the optical axis. The present invention provides for an additional means for reducing the divergence, if needed, of said sources by individual lenses or a single microlens array with lenslet centers matching the centers of the sources and can be added to the system, after the sources and before the first homogenizing sheet, for the purpose of increasing efficient usage of the light sources.

In addition to the optical sheet, system and display, an economical and high quality method of manufacturing the optical sheet is also provided using the following steps: (1) preparing a homogenous glass, metal, or crystalline substrate that is substantially flat, parallel, and clean; (2) forming a film of etching resist on the substrate; (3) patterning the resist film so as to form a three dimensional surface relief array of starter-profile cavities of spherical or a spherical profile; (4) anisotropically etching the resist pattern into the substrate so as to form similar cavities in the substrate, as by reactive ion etching; (5) removing all remaining resist; and (6) isotropically etching the array of starter profile cavities further into the substrate so that adjacent cavities are separated by a substantially sharp transition seam, and the array of etched cavities exhibit the profile of the desired microlens array surface.

The first master mold can then be replicated into two daughter molds by the following steps: (1) coating the master mold with a thin conductive coating, if needed, so that it exhibits a surface that is substantially conductive; (2) depositing metal on the conductive master mold so as to build an electroformed mother mold through electroforming; (3) parting the resulting metal mother mold; (4) depositing metal on the electroformed mother mold through electroforming to form a first daughter mold; (5) parting the resulting metal daughter mold; (6) depositing metal on the electroformed mother mold through electroforming to form a second daughter mold; and (7) parting the resulting second metal daughter mold.

The daughter molds will be substantially similar and can then be arranged so as to mold the light homogenizer optical sheet with the following steps: (1) attaching two daughter molds onto a mold die, having the ability to adjust stop distance between the two daughter molds upon molding, such that the lenslet cavities are substantially aligned concave structures facing each other and mold stops set so as to obtain substantially even thickness across the final molded optical sheet; (2) then applying mold release to the daughter molds; (3) placing resin between the two daughter molds; (4) pressing the die together with heat, if needed; (5) releasing pressure; and (6) removing the optical sheet formed there between.

DESCRIPTION OF THE DRAWINGS

FIG. 5 represents six possible tiling patterns that can be utilized for the first and second microlens array surfaces of a light homogenizing optical sheet.

FIGS. 9A–9H illustrates a method for fabricating two daughter molds.

FIG. 12A illustrates an illumination system comprised of an array of light sources, and one light homogenizing sheet.

FIG. 12B illustrates a display system comprised of an array of light sources, one light homogenizing sheet, and a Flat Panel Matrix Display.

FIG. 12C illustrates a display system comprised of an array of light sources, one light homogenizing sheet, a Flat Panel Matrix Display, and Exit-Pupil-forming optics.

FIG. 12D illustrates a display module, such as those used in FIG. 12B & 12C, that utilizes mirrored sidewalls to improve efficiency and compact size.

FIGS. 13A–13H represents exemplary source array tiling patterns.

FIG. 15A & 15B illustrate a cross-section of a tailored light homogenizing optical sheet.

FIG. 16A is an illumination system utilizing a tailored light homogenizing optical sheet.

FIG. 16B is a display system utilizing a tailored light homogenizing optical sheet and a Flat Panel Matrix Display, allowing substantial overlap of the exit Numerical Apertures at a viewing plane.

FIG. 16C is a display system utilizing one light homogenizing optical sheet, one tailored light homogenizing optical sheet, and a Flat Panel Matrix Display, allowing substantial overlap of the exit Numerical Apertures at a viewing plane.

FIG. 16D is a display system utilizing one tailored light homogenizing optical sheet, a Flat Panel Matrix Display, and an Exit-Pupil-forming optical system, allowing the Exit Pupil Plane to be shifted along the z axis.

DESCRIPTION OF THE PREFERRED EMBODIMENT(S)

Referring to the accompanying FIGS. there is shown an optical sheet 10 that exhibits the property of accepting light equal to or within a designed input acceptance cone angle, or Numerical Aperture, then redirecting the input light as output into a constant design exit cone, exiting substantially normal to the sheet surface such that the light intensity within the cone is substantially uniform in intensity versus angle. It should be noted that the optical sheet 10 can function for a continuum of wavelengths of visible light as well as ultraviolet, infrared, far-infrared, and other radiation wavelength ranges, depending on the choice of material used to form the sheet. Further, it should be noted that choice of a material exhibiting substantially high transparency and limited dispersion throughout a given spectrum provides for a radiation homogenizing optical sheet that functions substantially consistent for all wavelengths within such wavelength spectrum. For such case, the sheet functions substantially independent of wavelength of the source to be homogenized.

Figure 4A:
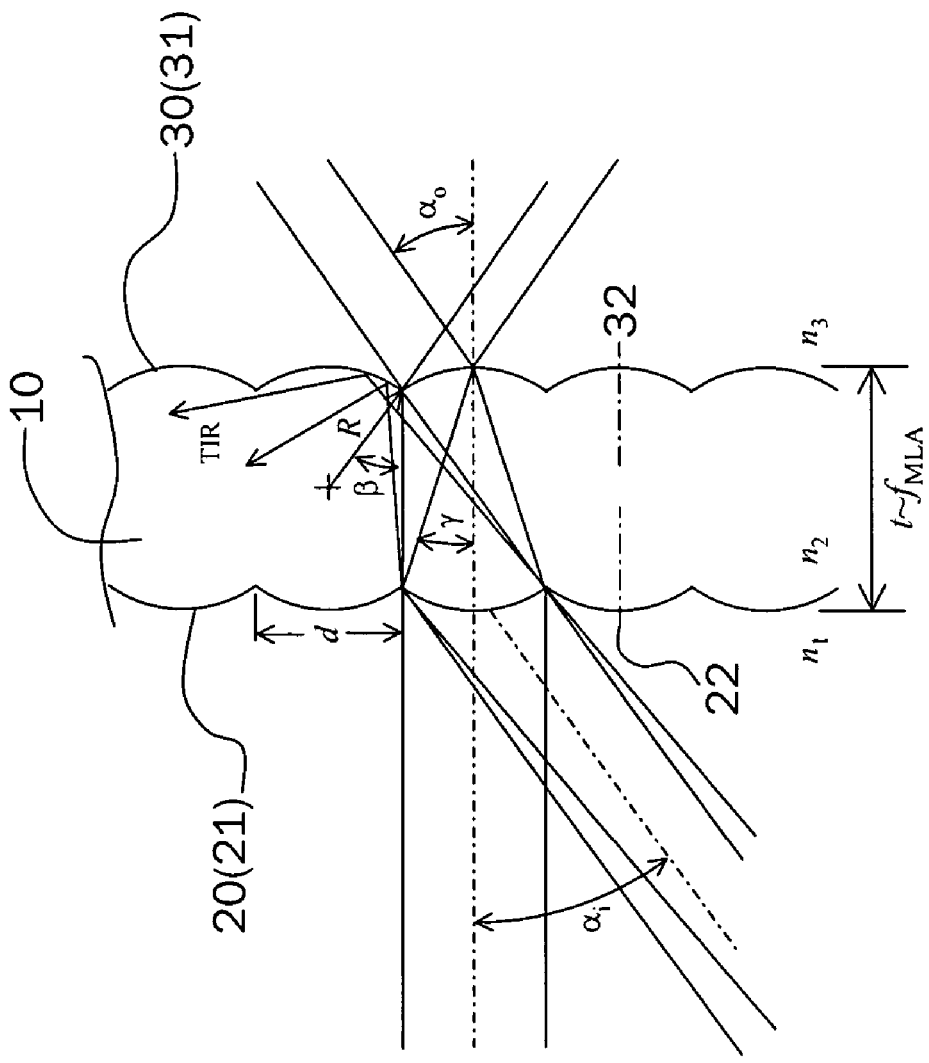
FIG. 4A represents a cross-section of a light homogenizing optical sheet.

Referring to FIG. 4A, the light homogenizing optical sheet 10 comprises two microlens array surfaces 20, 30, formed on its opposite front and back surfaces. Each array surface 20, 30 is made of a plurality of semi-spherical or aspheric profiles 21, 31, having lenslet centers 22, 32, that are substantially transversely aligned and registered with a profile 31, 21, located on the opposite surface. The specific shape of the profiles 21, 31 of the two microlens arrays 20, 30 depends on the relative refractive indeces of the environments adjacent to each sheet surface, as follows:

| Refractive Index Relationship | MLA Profile Surface 1 | Surface 2 |
|---|---|---|
| $n_1, n_3 < n_2$ | Convex | Convex |
| $n_1 < n_2 < n_3$ | Convex | Concave |
| $n_1 > n_2 > n_3$ | Concave | Convex |
| $n_1, n_3 > n_2$ | Concave | Concave |

The thickness of the optical sheet 10 is set such that both microlens arrays 20, 30 are separated substantially close to the lenslet focal length, as defined by the profile of the lenslet, the index of refraction of the sheet medium $n_2$, and the index of refraction of the sheet environments $n_1$ and $n_3$. For a sheet placed in an environment such that $n_3 = n_1$, the acceptance angle $\alpha_i$ and exit angle $\alpha_0$ will be substantially equal, and the sheet thickness can be approximately described by Eq. 1.

$$t \cong f_{MLA} \cong \frac{d}{2\tan\left(\sin^{-1}\left(\frac{n_1 \sin\alpha_o}{n_2}\right)\right)}, \quad (1$$

where d is the pitch of the microlens surface structure, $n_2$ is the refractive index of the sheet media, $n_1$ is the refractive index of the sheet environment, $\alpha_o$ represents both the acceptance angle as well as the exit angle of the sheet, $f_{MLA}$ is the focal length of the lenslets of the sheet within the sheet, and t is the thickness of the sheet. This approximation holds for both spherical and aspherical lenslet profiles. In general, then, the acceptance angle then becomes, $$\alpha_i \cong \alpha_o \cong \sin^{-1}\left[\left(\frac{n_2}{n_1}\right)\sin\left[\tan^{-1}\left[\frac{d}{2 f_{MLA}}\right]\right]\right]. \quad (2$$

The exit Numerical Aperture (NA) exhibited by a sheet design is defined in Eq. 3, $$NA \cong n_1 \sin[\alpha_o], \quad (3$$

where $n_1$ is the refractive index of the media surrounding the sheet. However, designs of homogenizing sheets exhibiting moderate exit NAs, for example below the range NA~0.3 to 0.4, can achieve reasonable results with the use of spherical lenslet profiles. For the case of using spherical lenslet profiles to achieve moderate exit angles, the focal length of a lenslet within the sheet can be defined as in Eq. 4, $$f_{MLA} \cong \left(\frac{n_2}{n_2 - n_1}\right)R, \quad (4$$

where R is the profile radius of the lenslet surface. The acceptance angle $\alpha_i$ using such a profile radius R is then approximated by Eq. 5, $$\alpha_i \cong \alpha_o \cong \sin^{-1}\left[\left(\frac{n_2}{n_1}\right)\sin\left[\tan^{-1}\left[\frac{(n_2 - n_1)d}{2 n_2 R}\right]\right]\right]. \quad (5$$

The light homogenizing single optical sheet 10 of the present invention is distinct by noting that all light entering the sheet from outside the acceptance angle can be reflected by Total Internal Reflection (TIR), if the design is such that $\beta > \theta_c$, where $\beta$ represents the angle between the lenslet profile surface normal at the outer edge of the lenslet and the surface normal of the sheet plane.

Note that for the general case of Eq. 2, it can be shown that high exit angles approaching 90° are possible as the angle within the sheet $\gamma$, shown in FIG. 4A, approaches the critical angle, as defined by Eq. 6, $$\text{For } \gamma \cong \sin^{-1}\left(\frac{n_2}{n_1}\right), \text{ we have } \alpha_{max} \cong 90° \quad (6$$

for $\gamma$, angle of focus Numerical Aperture within sheet medium index $n_2$.

For comparison purposes, note that the typical two oppossedly faced microlens arrays in parallel found in the prior art (See FIG. 1) suffer significant limitations in exit Numerical Aperture extent due to Total Internal Reflection (TIR) limits at the first microlens array plane, as indicated by Eq. 7, $$\alpha_{2max} \cong 90 - \sin^{-1}\left(\frac{n_2}{n_1}\right), \quad (7$$

where $\alpha_{2max}$ represents the maximum exit angle for the two-sheet microlens array in tandem case.

Figure 4B:
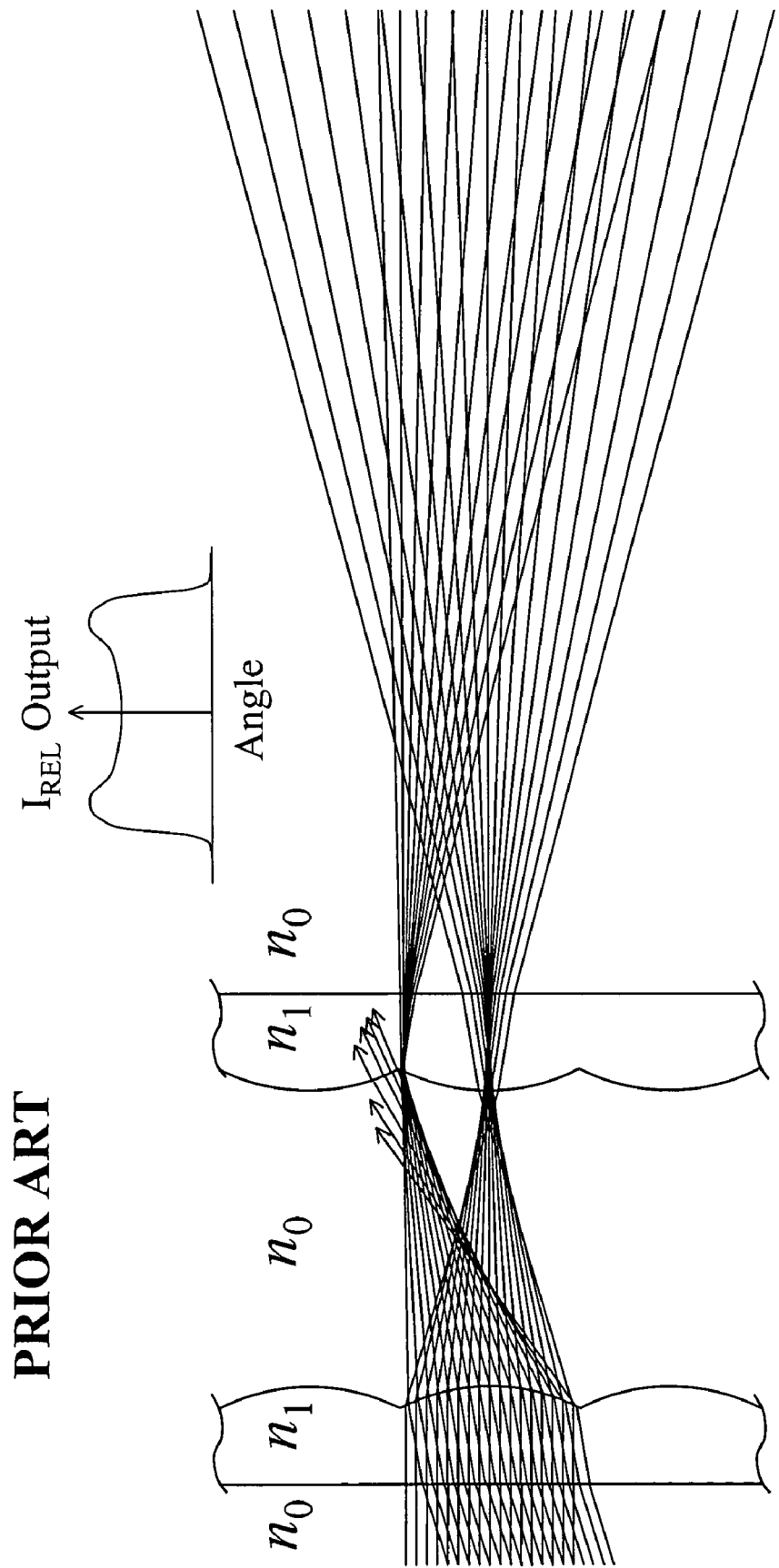
FIG. 4B illustrates uniformity limitations of the prior art two opposedly-faced microlens arrays case for higher exit angles.
Figure 4C:
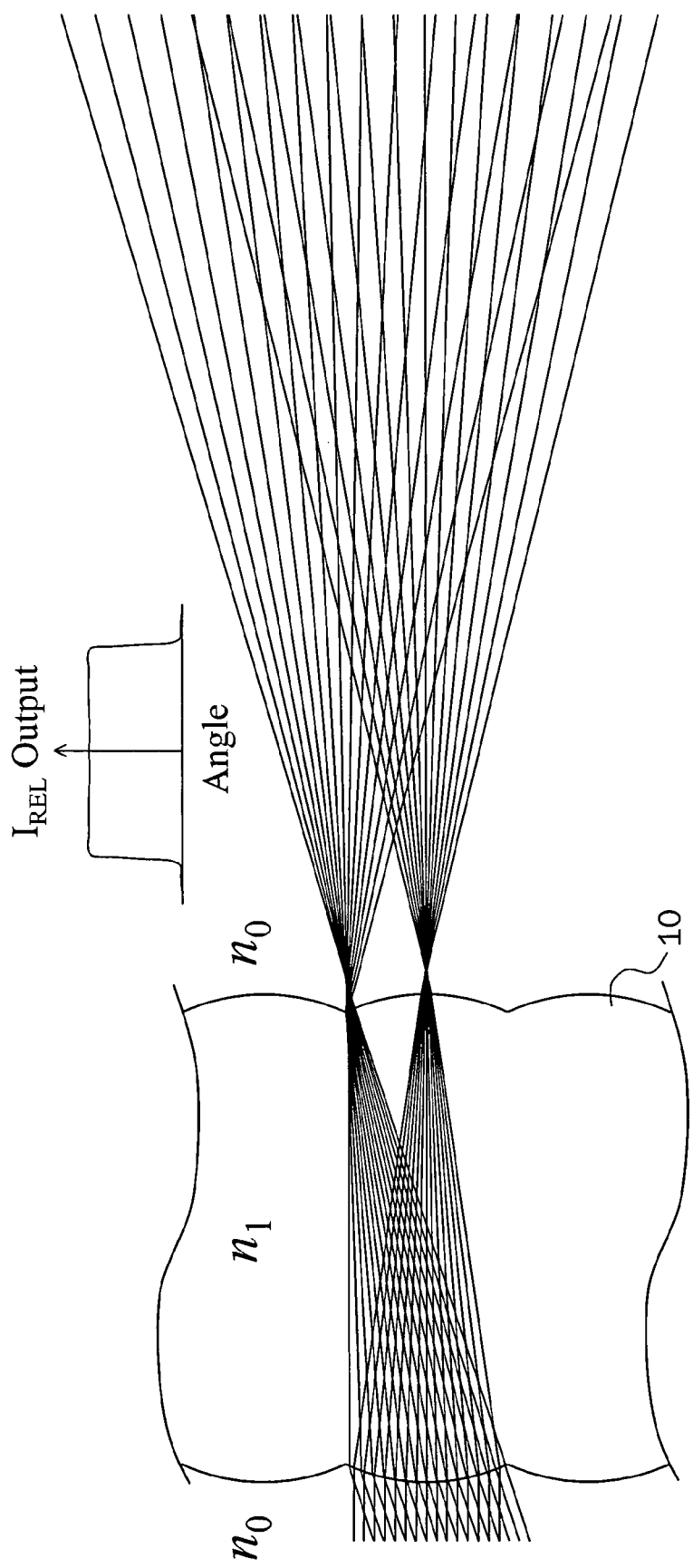
FIG. 4C illustrates improved uniformity performance exhibited by the light homogenizing optical sheet for higher exit angles.

In addition, the inventors of the present invention have discovered that for the case of substantially matching exit angle to acceptance angle, the two-opposedly faced microlens arrays case suffers limited uniformity, especially for exit angles significantly above ±15°. This limitation is caused by inherent aberrations in the wavefronts for this lenslet surface directed orientation, as illustrated in FIG. 4B. Note that the aberrations for the single sheet case, having convex surfaces facing away from the sheet center, are significantly constrained such that it is now possible for a sheet to exhibit an exit angle substantially similar to its acceptance angle, as illustrated in FIG. 4C. For high exit angles significantly above ±15°, it is simply not possible to achieve the same high level of uniformity for the two-opposedly faced microlens case while maintaining substantial equal acceptance and exit angles.

It should be noted that for an optical sheet 10 placed in an environment such that $n_3 \neq n_1$, the optical sheet 10 thickness and focal length within the sheet can be approximated using Eq. 1, but $\alpha_o$ will only represent the exit angle. In this case, the acceptance angle $\alpha_i$ can then be approximated by Eq. 8.

$$\alpha_i \cong \sin^{-1}\left(\frac{n_3 \sin[\alpha_o]}{n_1}\right), \quad (8$$

On axis, the optical sheet 10 functions as described above due to its Fourier transforming property of lenslet apertures. When light having spotsize substantially larger than the microlens array pitch illuminates the light homogenizing sheet, an illuminated lenslet can be considered to have a substantially filled aperture with an intensity profile approaching that of a Top-hat distribution. As this light is focused onto the second microlens array surface 30 at the focal length distance through the sheet, the intensity is substantially focused to a spot smaller than the pitch of the microlens array. In terms of 1-dimensional physical optics, the array of clear apertures at the first microlens array surface 20 transform into an array of Sinc-function intensity profiles at the second microlens array plane, each differing from an ideal Sinc function in terms of a quadratic phase factor. Once propagating through the second microlens array surface 30, the quadratic phase error is corrected, but essentially apodized by the width of the second microlens array surface 30 clear apertures, resulting in an array of Sinc functions that have been low-pass filtered in terms of spatial-frequency content. Each microlens set exhibits a far-field diffraction envelope having a profile substantially forming a spatial-frequency limited Top-hat intensity profile.

Finally, if the sources exhibit substantial coherence, neighboring microlens-set far-field diffraction envelopes interfere, forming interference diffraction orders within the diffraction envelope angular extent. It should be noted that although the interference diffraction order spacing is dependant on wavelength, the diffraction envelope is substantially constant for a continuum of wavelengths, and therefore exhibits a substantially wavelength-independent diffraction envelope. Since the Sinc-functions have been filtered, the top-hat profile of the diffraction envelope in the far field will not be an ideal Rectangular function, or Top-hat profile; however, larger exit Numerical Aperture designs exhibit broadened spatial frequency content and can therefore produce higher uniformity across the diffraction envelope, depending on the limits of dispersion of the sheet media.

Consider two microlens arrays separated by their focal length, $f_{MLA}$. Let the sag $t_s$ of a single microlens for given surface coordinates be defined by thickness function $t_s(x,y)$, which has a spherical profile.

$$t_s(x, y, d, R) = \sqrt{R^2 - x^2 - y^2} - \sqrt{R^2 - \left(\frac{d}{2}\right)^2} \quad \left(\text{for } -\frac{d}{2} \leq \sqrt{x^2 + y^2} \leq \frac{d}{2}\right) \tag{9}$$

for R, profile radius of each spherical microlens
 d, diameter of microlens

The transmission function, $\phi(x,y)$, represents the phase transmission function of a single microlens in terms of phase shift across the surface. Note that the amplitude is constant within the microlens area, since no masking or attenuation function is applied to its clear aperture.

$$\phi(x, y, d, R) = k_z(n_2 - n_1)\left(\sqrt{R^2 - x^2 - y^2} - \sqrt{R^2 - \left(\frac{d}{2}\right)^2}\right) \tag{10}$$

for $n_1$, index of refraction of sheet environment
 $n_2$, index of refraction of sheet media
 $k_z$, where $$k_z = \frac{2\pi n_2}{\lambda}$$

Now, it can be considered that the clear aperture of the first microlens acts as a transmission function object that can be considered to have Fourier Transform at distance $f_{MLA}$, which is the plane of the second microlens of the set. However, while the intensity profile just before the second microlens appears to be the Fourier Transform, there is a quadratic phase error that keeps this profile from being an ideal Fourier Transform. It is this quadratic phase error, given by the term that precedes the integral in Eq. 11, which needs to be corrected in order to implement an ideal Fourier Transform relation in terms of both phase and amplitude.

$$F(x, y) = \frac{e^{\left(\frac{ik_z}{2f_{MLA}}(x^2+y^2)\right)}}{i\lambda f_{MLA}} \int_{-\infty}^{\infty}\int T(x, y)\exp[-i\phi(x, y, d, R)]dxdy \tag{11}$$

for $f_{MLA}$, focal length of microlens
 T(x,y), transmission function, where $$T(x, y) = \begin{cases} 1, 0 \leq \sqrt{x^2 + y^2} \leq \frac{d}{2} \\ 0, \text{else} \end{cases}$$

The quadratic phase term can be specified in terms of phase shift Q.

$$Q = \frac{\pi n_2}{\lambda f_{MLA}}(x^2 + y^2) \tag{12}$$

In terms of optical imaging, the second microlens array is imaging the first mircolens array lenslet apertures to infinity such that when these first array lenslet apertures are filled with a substantially flat intensity profile, an image of the aperture is projected toward infinity. Such an image has associated with it an effective Exit Numerical Aperture, defined substantially by the lenslet tile shape, the focal length, refractive index of the sheet medium, and refractive index of the surrounding environment of the optical sheet.

It should be noted that for a given lenslet profile design, slight variance of thickness t with respect to $f_{MLA}$ can be used to adjust the exit angle as indicated below, but the surface normal exiting properties of the sheet will be affected.

| Thickness t Relative to Lenslet $f_{MLA}$ | Exit Angle $\alpha_o$ |
| --- | --- |
| $t = f_{MLA}$ | as described |
| $t < f_{MLA}$ | increases |
| $t > f_{MLA}$ | decreases |

FIG. 5 illustrates some of the possible tiling patterns that can be used for constructing the microlens array surfaces of the homogenizing sheet. They include: Hexagonal 114, Triangular 115, Compressed Hexagonal 116, Lenticular (Linear) 117, Square 118, and Rectangular 119. It should be noted that any tiling pattern that exhibits a repeating pattern can be used in the tiling of the microlens array structure on either first or second surface of the sheet. Note that the present invention includes the use of one-dimensional tiling patterns, such as lenticular arrays, as well as two-dimensional tiling patterns.

Figure 6:
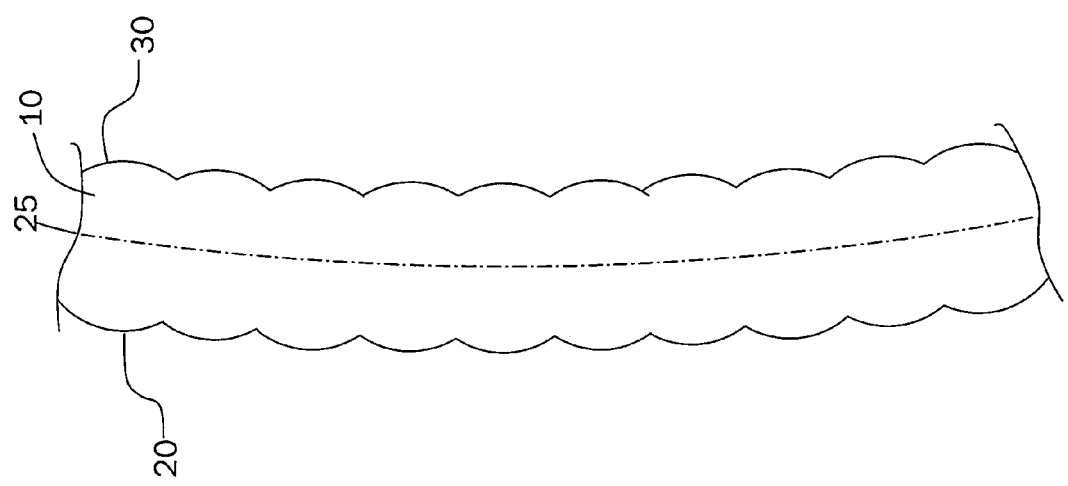
FIG. 6 represents a cross-section of a curved or non-planar light homogenizing optical sheet.

As a further embodiment of the present invention, the light homogenizing optical sheet 10 can be non-planar as indicated in FIG. 6. This embodiment includes cylindrical, spherical, and aspherical sheet form 25 and can be used to achieve varied exit cone angle versus transverse position.

The angular response of the sheet is unique due to the refractive nature of the light homogenizing sheet. Light illuminating the sheet at an oblique angle will be focused by the first microlens array surface 20 and redirected by the second microlens array surface 30, exiting substantially normal to the sheet surface.

Figure 1:
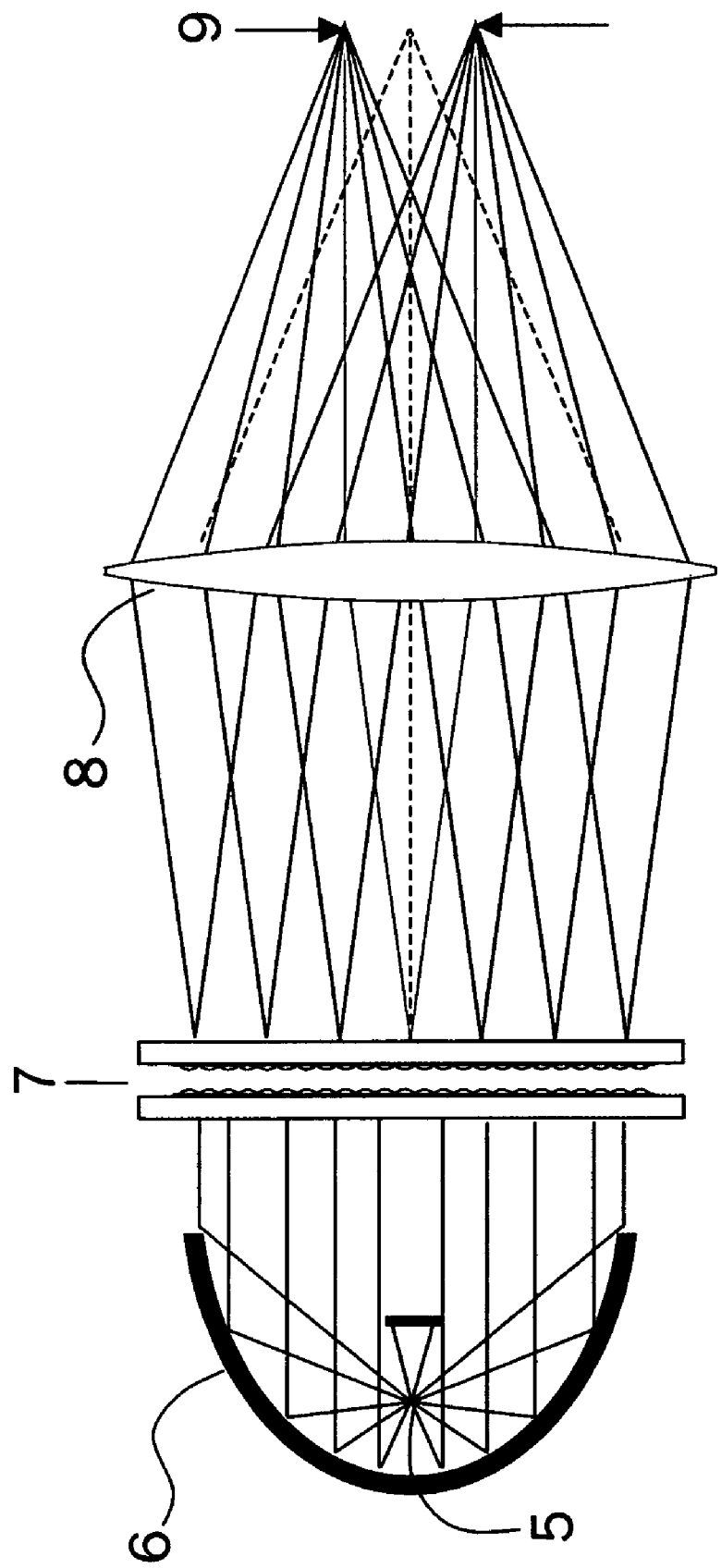
FIG. 1 is an illustration of an illumination system found in the prior art that uses two parallel identical optical sheets each with a microlens array formed one surface that are aligned and registered.

By forming a single optical sheet 10, the issue of total internal reflection beyond the critical angle at the first microlens array surface 20 is solved. In addition, the single optical sheet 10 can be designed to exhibit a substantially larger exit Numerical Aperture compared to the limits of the dual microlens arrays in tandem approach as shown in FIG. 1.

Figure 17B:
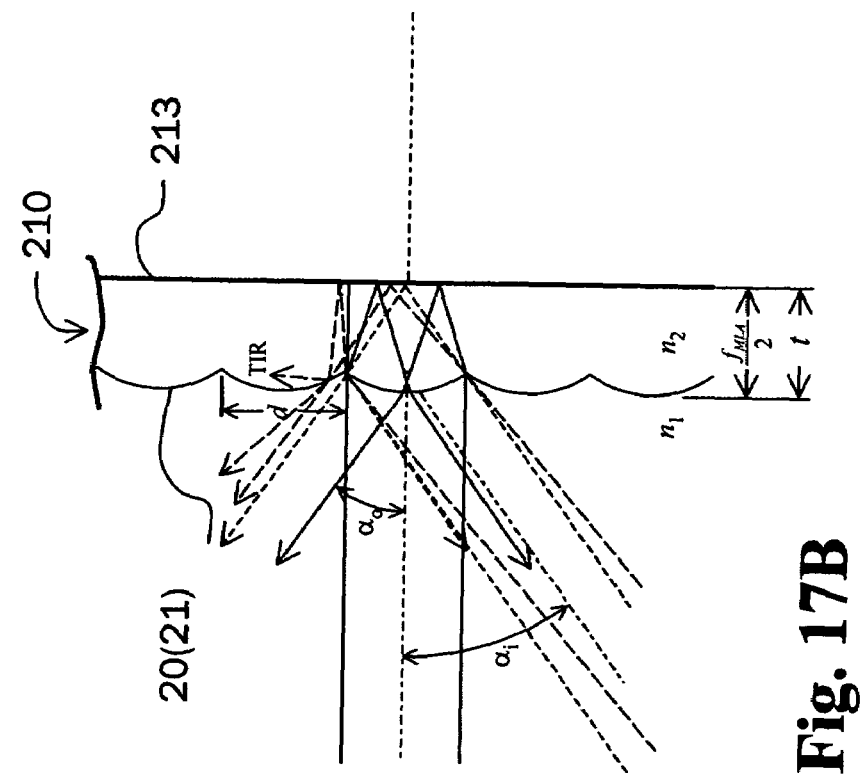
FIGS. 17A and 17B are reflective light homogenizing sheets.
Figure 17A:
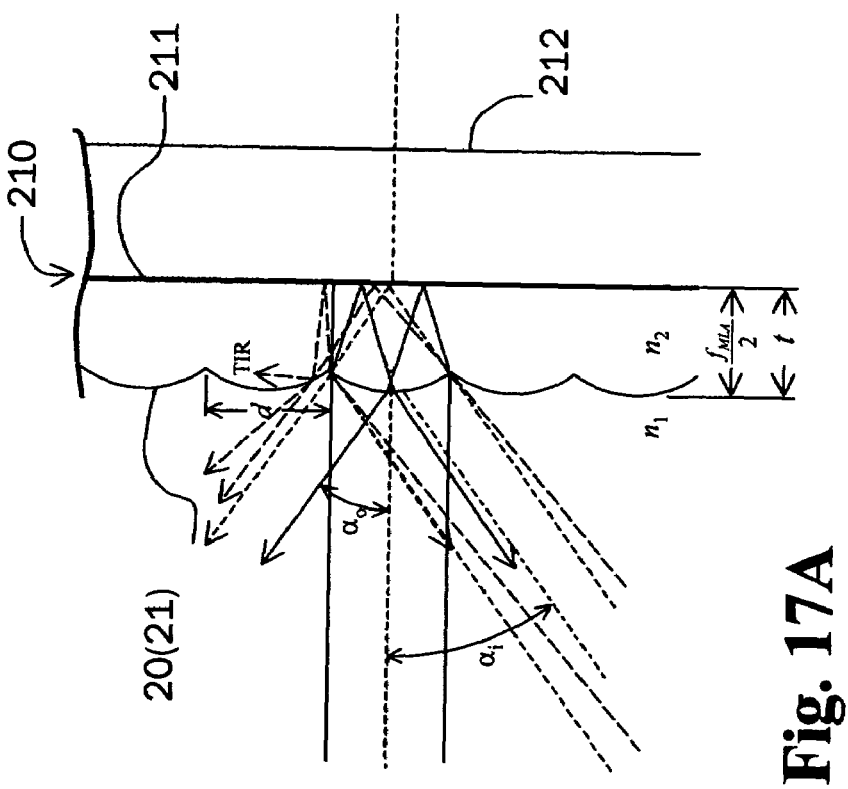
Figures 18, 19:
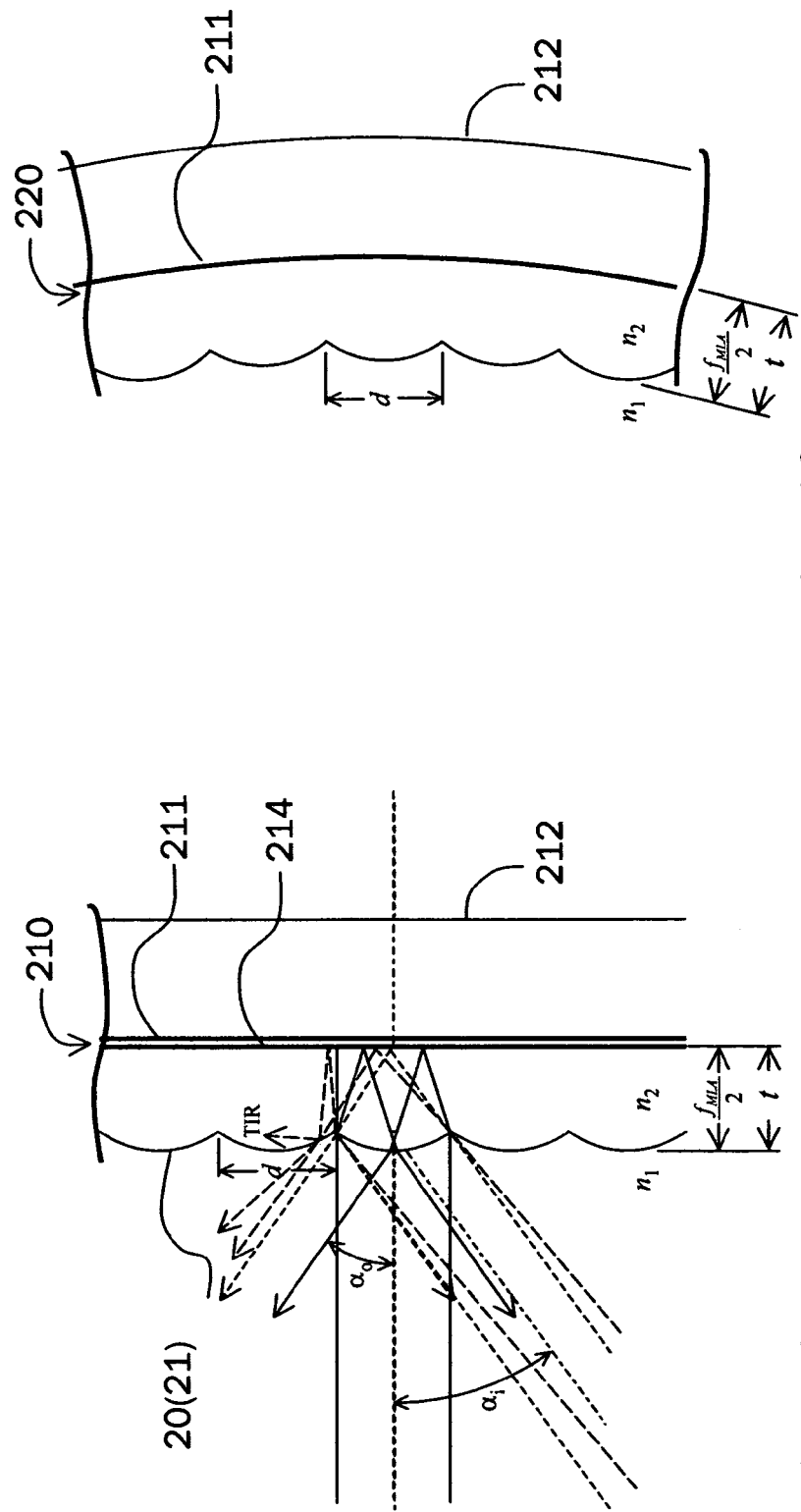
FIG. 18 is a reflective light homogenizing sheet with a retarding layer.
FIG. 19 is a curved reflective light homogenizing sheet.

It should be noted that the light homogenizing optical sheet exhibits fold symmetry across a plane at its center of thickness. In such a case, a reflective light homogenizing sheet 210 can be formed as in FIG. 17A such that the first microlens surface 20(21) is utilized for both the first pass and the second pass after reflection off the reflective layer 211 supported by substrate 212. In another embodiment, a similar sheet can be formed as in FIG. 17B by using the structure of the sheet itself formed to the half focal length and coated with reflective coating 213. Other embodiments can include a light-retarding layer 214, as in FIG. 18, so as to rotate or change the polarization state of the light illuminating the sheet upon reflection within the sheet, such as by use of a ¼-wave thin film retarder or waveplate. Further, the reflective optical sheet can be a curved reflective light homogenizing sheet 220 as in FIG. 19.

Fabrication

In a preferred method of manufacture of the homogenizing optical sheet 10, a first embodiment requires a first master mold 50 to be formed, as illustrated in FIG. 7. The first master mold 50 is formed by the steps of: preparing a homogenous glass, metal, or crystalline substrate 40 that is substantially flat, parallel, and clean; forming a film of etching resist 41 on the substrate 40 as in FIG. 7A; patterning the resist film 41 so as to form a three dimensional surface relief array of starter-profile cavities 42 having spherical, aspherical, or anamorphic surface profile as in FIG. 7B; anisotropically etching the resist pattern of cavities 42 into the substrate 40 so as to form similar cavities 44 in the substrate, as by reactive ion etching, such that the cavities 44 exhibit a sag equal to or greater than the sag, t, of the final design surface profile of the sheet as in FIG. 7C; removing all remaining resist 41; isotropically etching the array of starter profile cavities 42 further into the substrate in FIG. 7D so that adjacent cavities are separated by a substantially sharp transition seam 45 as in FIG. 7E, and the array of etched cavities exhibit the negative 48 of the profile of the desired microlens array surfaces, 20, 30. By first forming a non-flat starter profile, having a depth of at least the full sag of the desired final microlens array surface, then using anisotropic etching to transfer the profile shape into a substrate, and then using isotropic etching to continue the lenslet cavity growth toward a high fill factor, flat top profiles and rounded seams can both be avoided in the final lenslet profile shape, allowing non-flat-top profiles 46 and sharp seams 45 to be formed in the mold surface 48.

Figure 7A:
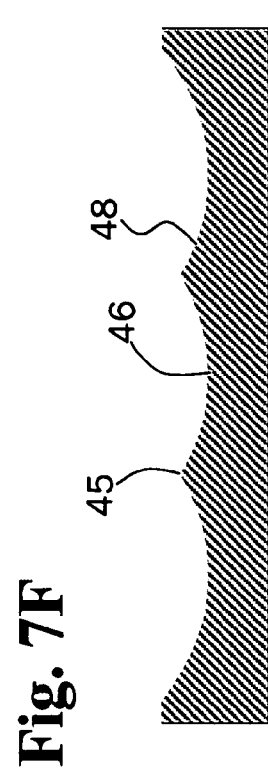
FIGS. 7A–7F illustrates a method for manufacturing a mold that can be used in the fabrication of the light homogenizing optical sheet, involving grayscale lithography, anisotropic etching, and isotropic etching.
Figure 7B:
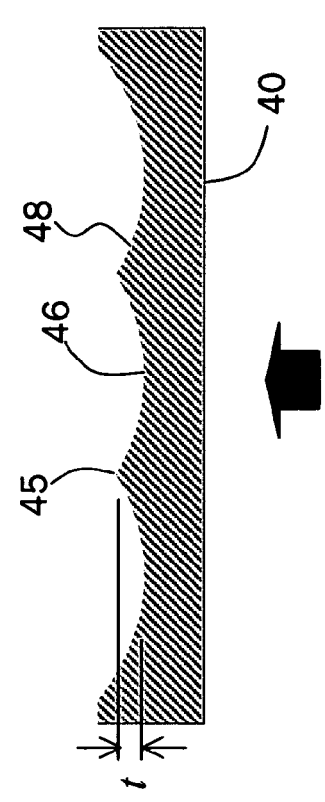
Figure 7C:
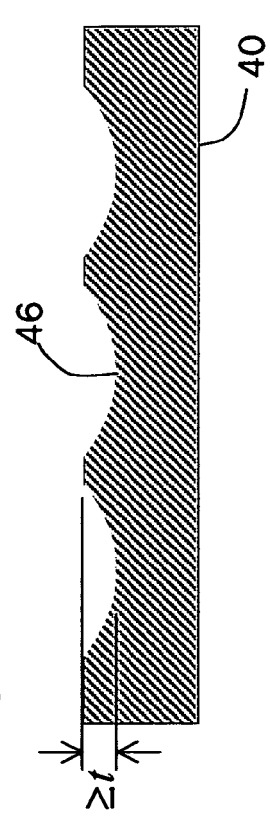
Figure 7D:
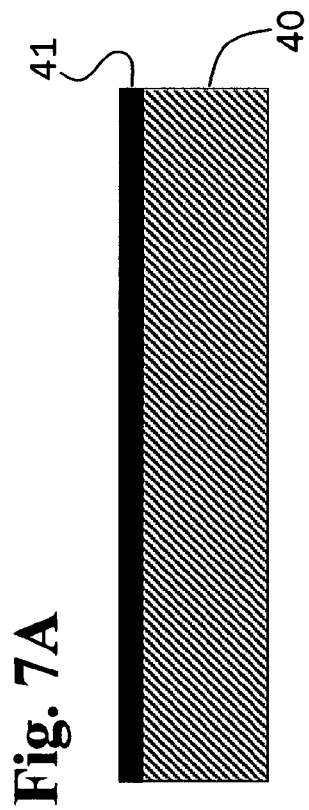
Figure 7E:
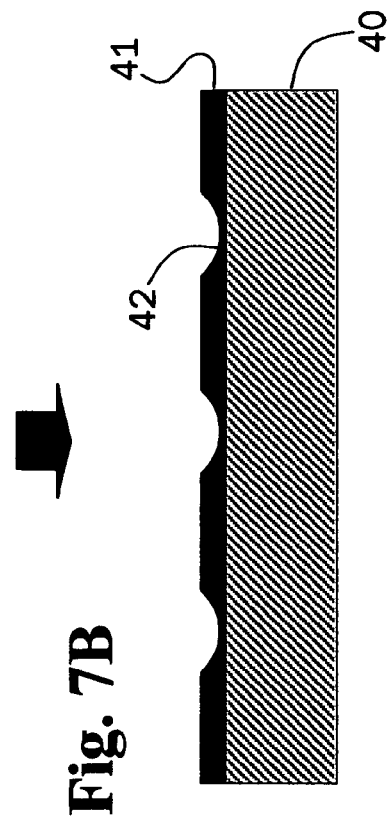
Figure 7F:
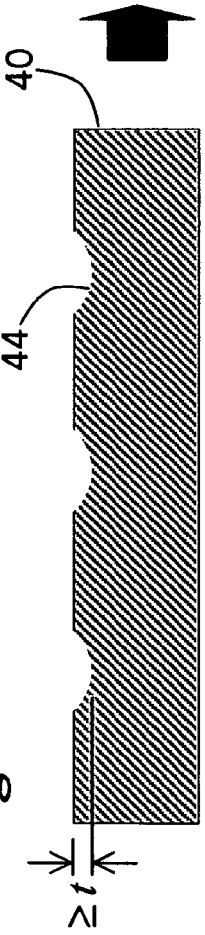
Figure 8A:
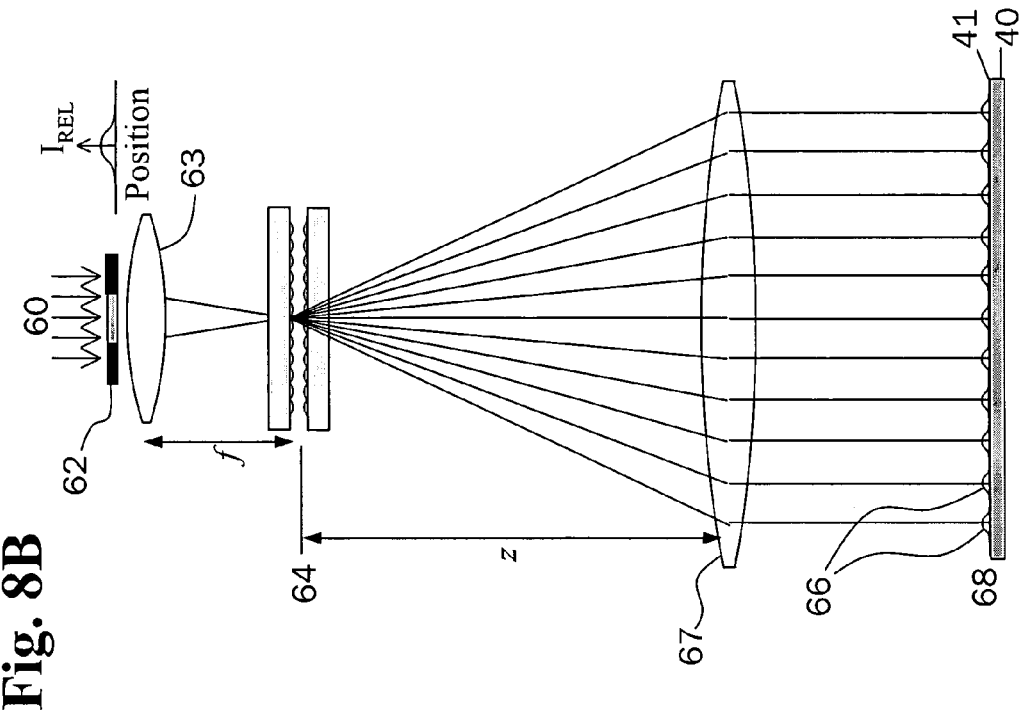
FIGS. 8A & 8B illustrate an additional method for producing the starter profiles that can replace the grayscale lithography step of FIG. 7B.
Figure 8B:
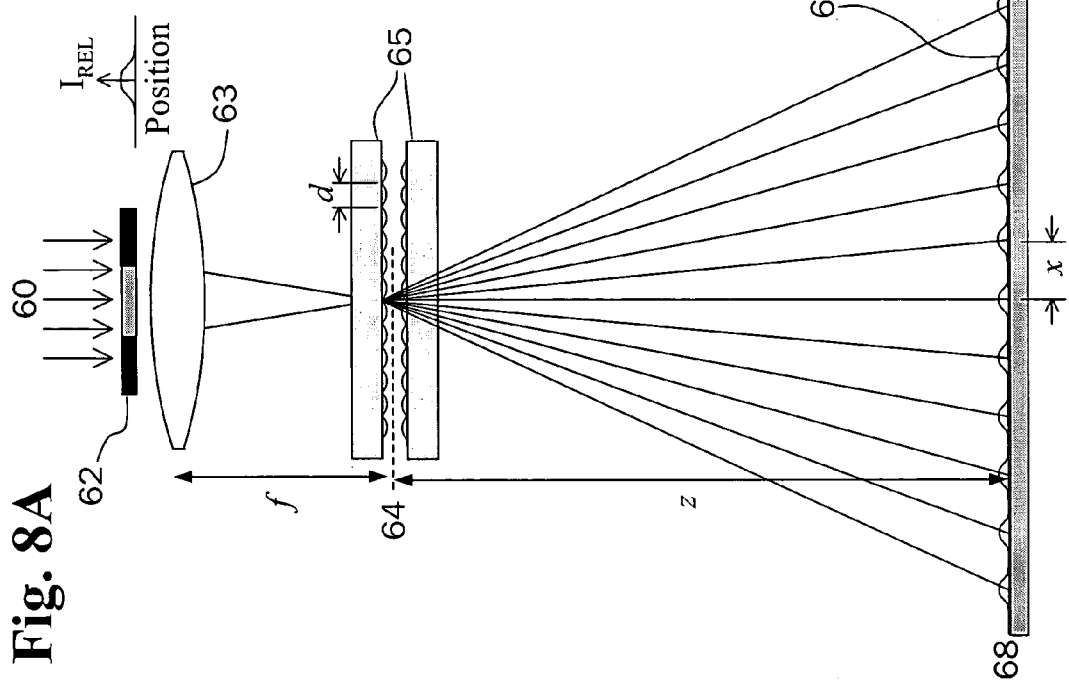

As a replacement step for the grayscale lithography process step of FIG. 7B in the previous embodiment, according to the present invention as illustrated in FIG. 8, the starter cavities 42 may be formed through the steps: (1) illuminating coherent radiation 60, such as ultraviolet, on a transmissive or reflective grayscale mask or digital mask 62, exhibiting the intensity profile required to expose one single starter profile in resist; (2) using optical system 63 to focus the single starter profile so as to form the profile Fourier transform at a plane 64 of a homogenizer array of microlenses 65 in tandem at focal length of separation, such that the angular extent of the starter profile mask is substantially equal to or smaller than the diffraction order angular spacing of diffraction orders 66 caused by the interaction of wavelength and dual microlens array pitch d; (3) exposing the far-field of the illuminated dual microlens array onto a resist-coated substrate 40 so as to pattern the resist 41 with a tiling pattern of replicas of the grayscale or digital mask intensity; (4) develop the resist pattern to form cavities 42; (5) anisotropically etching the resist pattern into the substrate so as to form similar cavities 44 in the substrate, as by reactive ion etching, such that the cavities exhibit a sag equal to or greater than the sag, t, of the final design surface profile of the sheet in FIG. 7C; (6) removing all remaining resist; (7) isotropically etching the array of starter profile cavities further into the substrate, FIG. 7D, so that adjacent cavities 42 are separated by a substantially sharp transition seam 45 of FIG. 7E, and the array of etched cavities exhibit the negative 48 of the profile of the desired microlens array surface, 20, 30. In such a setup, a high resolution graylevel mask cell corresponding to one lenslet tile can be replicated over large substrate areas at plane 68, allowing microlens arrays to be fabricated with low stitch or snap-grid errors commonly associated with step-and-repeat lithography methods. A collimating optical system 67 can be used to achieve uniform exposure of the resist-coated substrate 40 as in FIG. 8B.

According to the present invention as illustrated in FIG. 9, a first master mold 50 can then be replicated into two daughter molds 80 by the following steps: (1) coating the master mold with a thin conductive coating 70, if needed, so that it exhibits a surface that is substantially conductive as in FIG. 9B; (2) depositing metal 71 on the conductive master mold so as to build an electroformed mother mold 72 through electroforming, FIG. 9C; (3) parting the resulting metal mother mold 72, FIG. 9D; (4) depositing metal 71 on the electroformed mother mold 72 through electroforming to form a first daughter mold 80, FIG. 9F; (5) parting the resulting metal daughter mold 80; (6) depositing metal 71 on the electroformed mother mold 72 through electroforming to form a second daughter mold 80; and (7) parting the resulting second metal daughter mold 80 to achieve two daughter molds as shown in FIG. 9H.

Figure 10A:
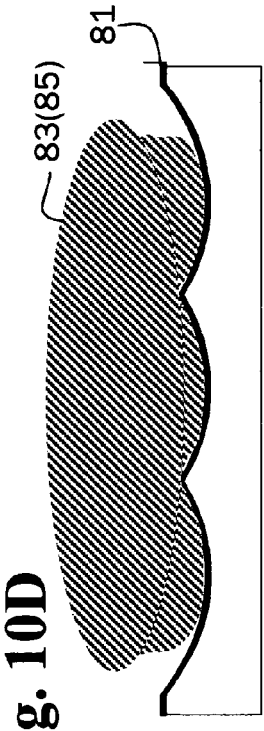
FIGS. 10A–10F illustrate methods for using two daughter molds to mold the light homogenizing sheet.
Figure 10B:
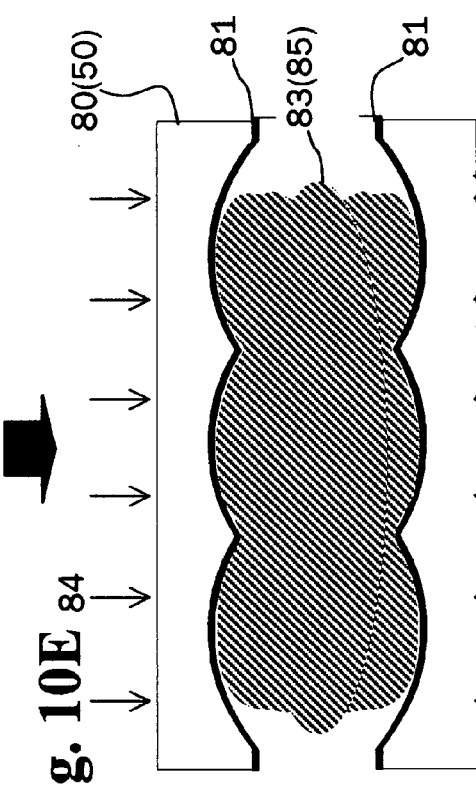
Figure 10C:
Figure 10D:
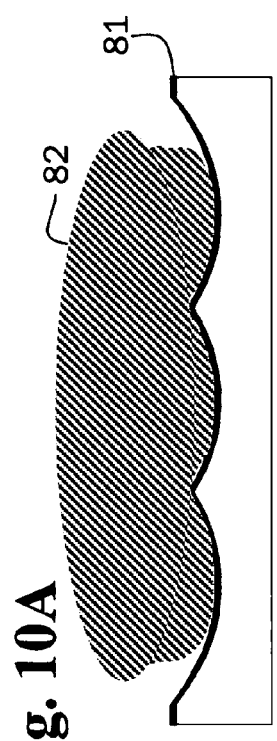
Figure 10E:
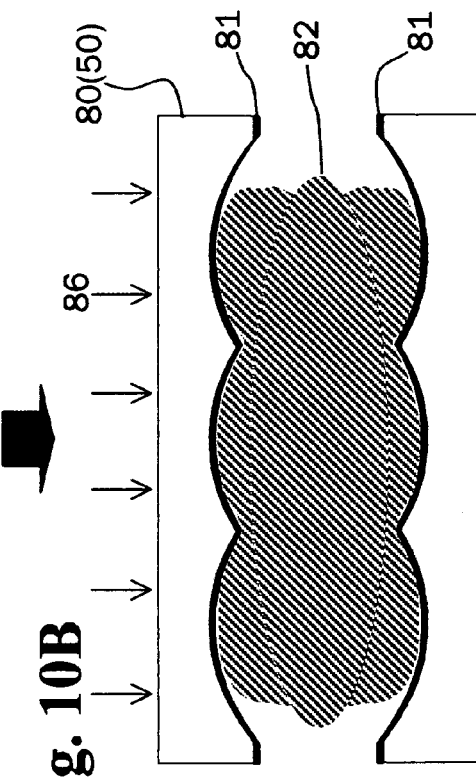
Figure 10F:
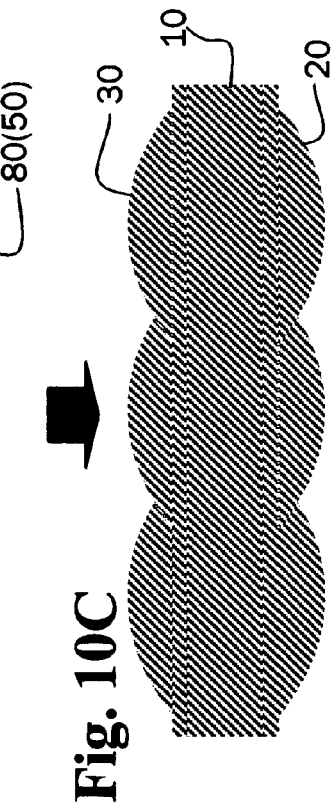
Figure 11A:
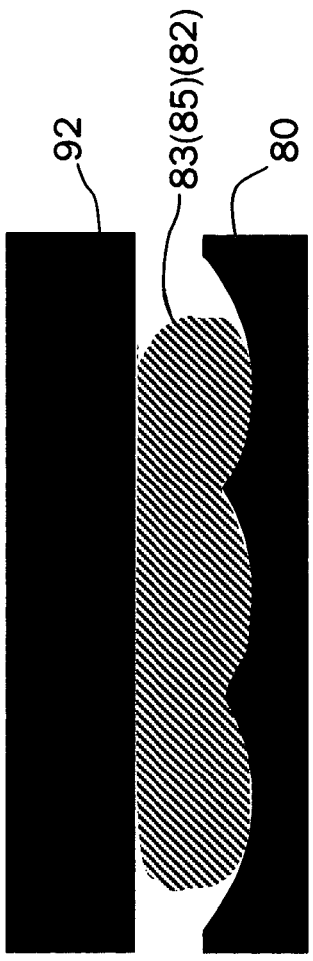
FIGS. 11A–11D illustrates a method for laminating two half-sheets to form a light homogenizing sheet.
Figure 11B:
Figure 11C:
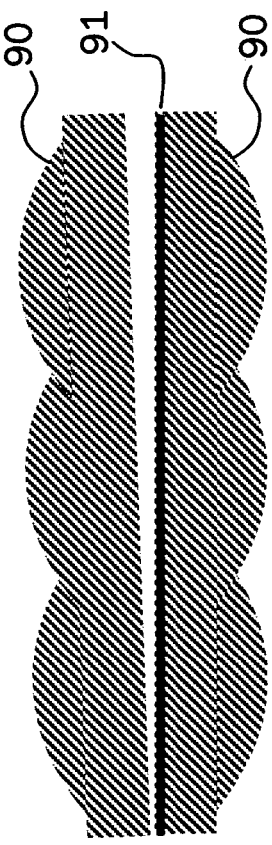
Figure 11D:

According to the present invention, as illustrated in FIGS. 10D–F, the daughter molds 80 are substantially similar and can then be arranged so as to manufacture the light homogenizer sheet 10 with the following steps: (1) attaching two daughter molds 80 onto a mold die, having the ability to adjust stop distance between the two daughter molds upon molding, such that the lenslet cavities are substantially aligned concave structures facing each other and mold stops set so as to obtain substantially even thickness across the final molded optical sheet 10; (2) applying mold release 81 to the daughter molds 80; (3) placing resin 83 or sheet 85 between the two daughter molds 80 as in FIG. 10E; (4) pressing the die together with force and heat 84 in FIG. 10E; (5) releasing pressure; and (6) removing the optical sheet formed there between. Once the daughter molds are fabricated, this molding process is applicable to injection molding processes as well as compression molding, transfer molding, and sheet embossing processes as known in the art.

Alternatively, as shown in FIG. 10A, a transparent mold master, such as made of glass, can replace one or both of the daughter molds, providing for a process to use Ultraviolet (UV) light casting having the steps of: (1) attaching one transparent master mold 50 and one daughter mold 80, or two transparent molds 50, onto a mold die, having the ability to adjust stop distance between the two molds upon molding, such that the lenslet cavities are substantially aligned concave structures facing each other and mold stops set so as to obtain substantially even thickness across the final molded optical sheet; (2) applying mold release 81 to the molds 80(50); (3) placing UV-curable epoxy 82 between the molds 80(50) as in FIG. 10B; (4) aligning the die; (5) Exposing UV light 86 through the transparent mold to cure the epoxy therein between; (6) releasing and; and (7) removing the optical sheet formed there between.

Figure 4D:
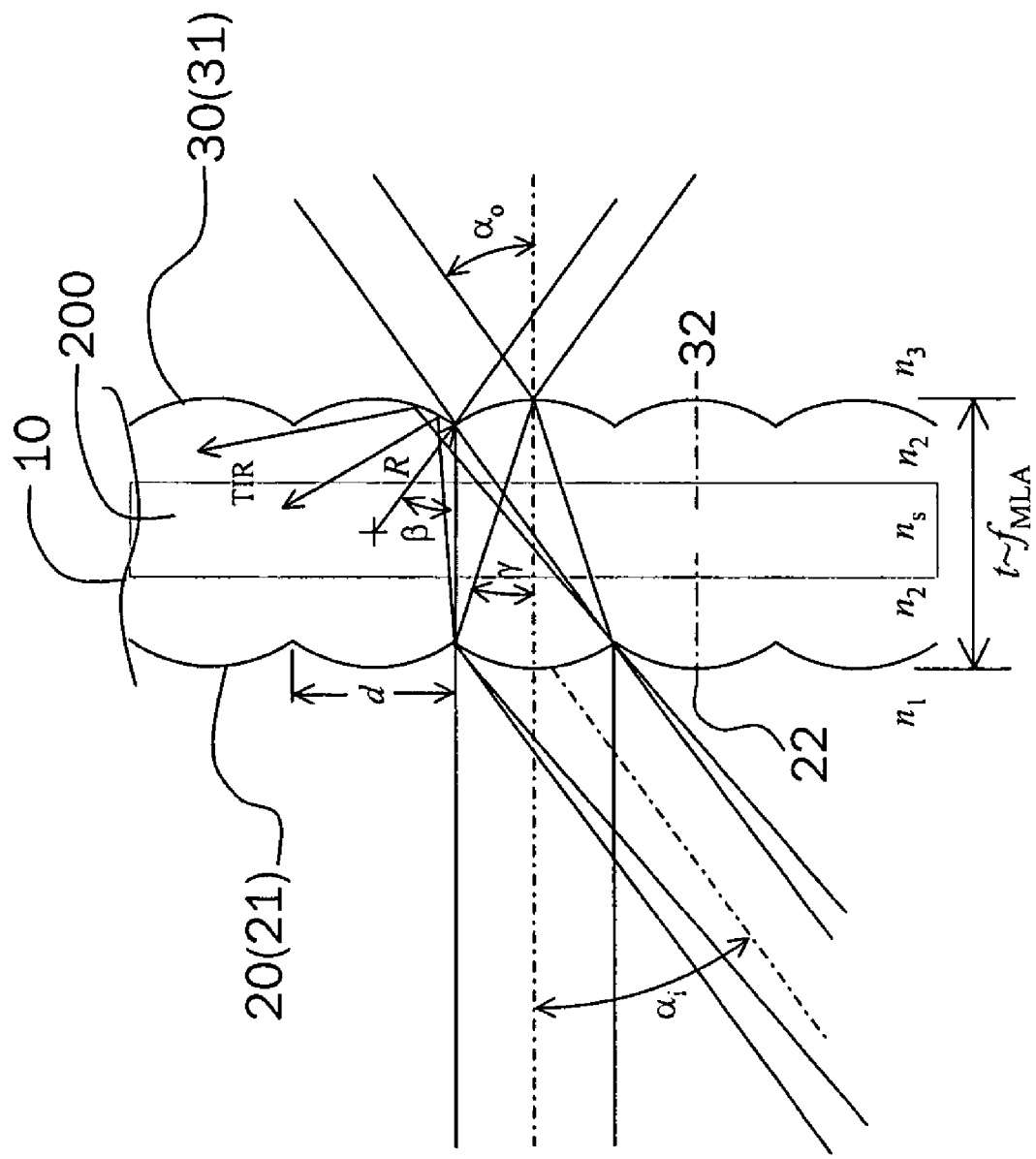
FIG. 4D is a cross-section of a laminated light homogenizing optical sheet containing one or more planar substrates within the thickness of the optical sheet.

According to the present invention, as illustrated in FIG. 11, two half-sheets 90, molded by use of a flat mold 92 and a daughter mold 80 or a master mold 50, can be laminated to form the light homogenizing optical sheet 10 by the following steps: (1) mold two half-sheets 90; (2) apply optical cement 91; (3) align and bond two half-sheets 90 as in FIG. 11C; (4) and remove the optical sheet 10. Note that the optical cement step can be replaced by alternative bonding methods, such as ultrasonic welding. It should be noted that the term half-sheet refers to the portions of functionality due to each of the two microlens surfaces of the optical sheet and is thus not limited to half the thickness of the sheet. Thus two half-sheets exhibiting different thickness can be combined to form an optical sheet. Further, two half-sheets can be molded onto the first and second surfaces of a common substrate, as by UV-cure epoxy using UV-transmissive molds, so as to form a single 3-layered optical sheet. Such a sheet is illustrated in FIG. 4D such that the microlens surfaces are molded onto both front and back surfaces of a common substrate, as by lamination or UV-curing.

Figure 21:
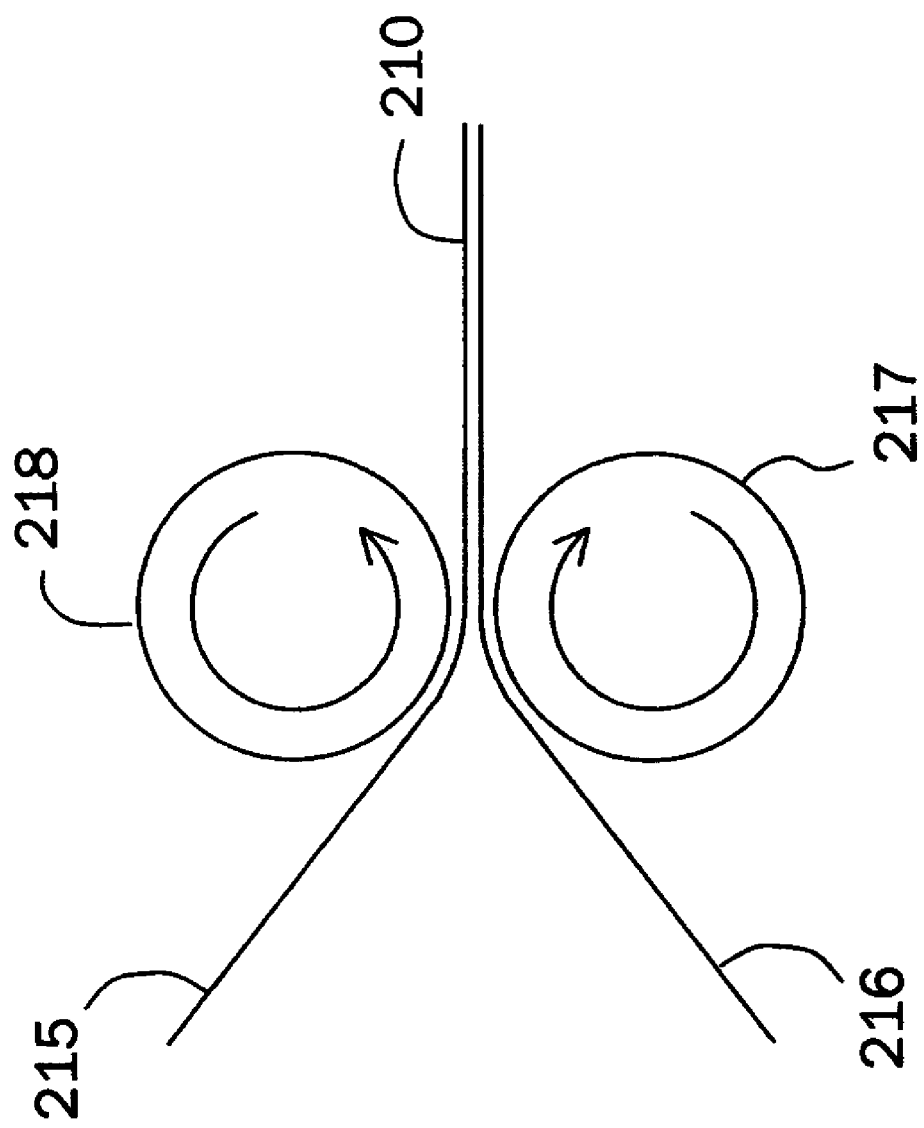
FIG. 21 illustrates a method of manufacture of reflective light homogenizer film sheet.
Figure 22A:
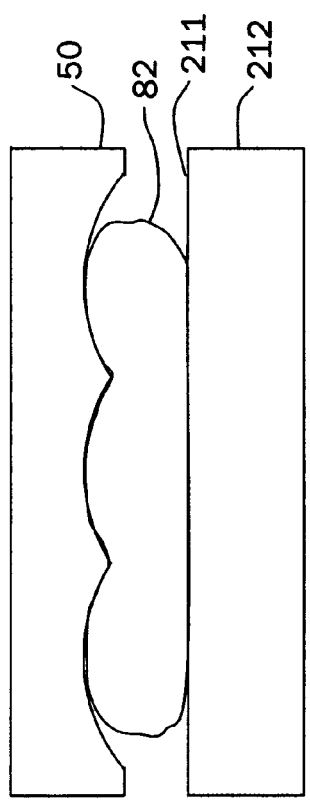
FIG. 22A, 22B, 22C and 23A, 23B, 23C illustrate methods of manufacture of the reflective light homogenizing sheet.
Figure 22B:
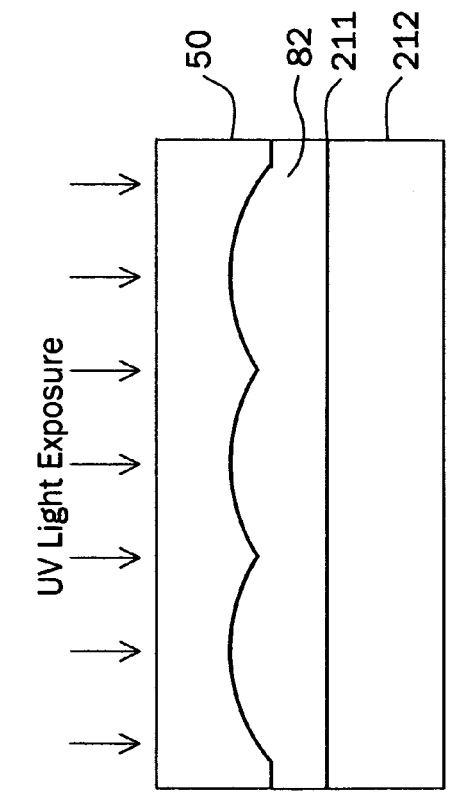
Figure 22C:
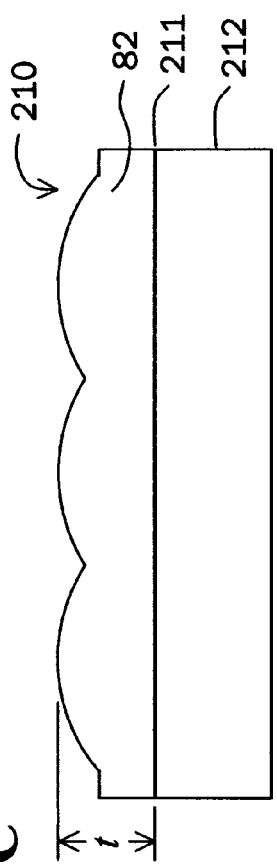
Figure 23A:
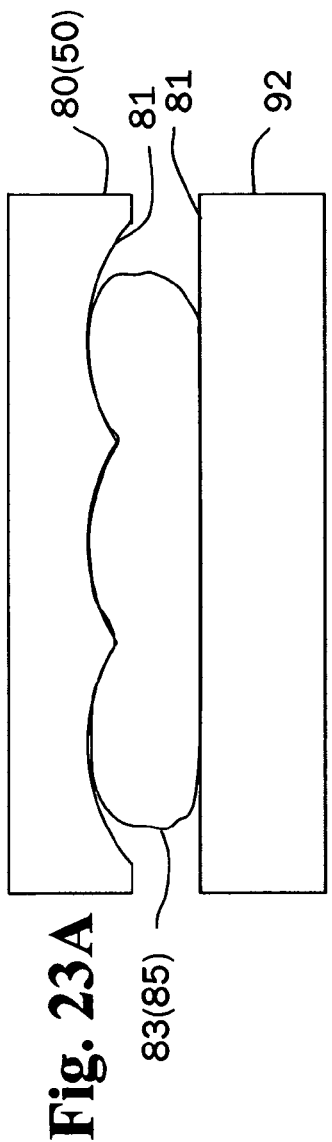
Figure 23B:
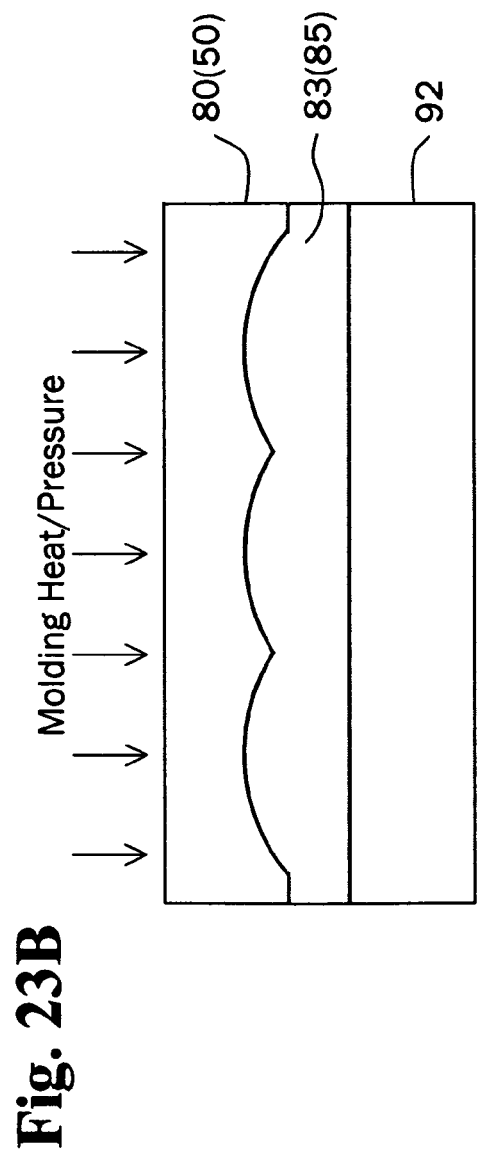
Figure 23C:
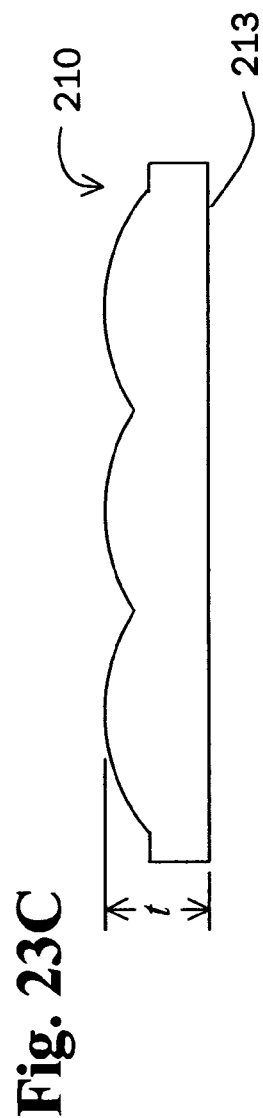

A method of molding a reflective light homogenizing sheet 210 is illustrated in FIG. 21 such that a transparent polymer sheet 215 and a reflective polymer sheet 216 are embossed and laminated by heat and force applied by two rollers, a cylindrical roller mold 217 and a cylinder mold 218 having a concave microlens surface, then cooled and drawn to form the reflective light homogenizing sheet 210. Another method of fabricating a reflective light homogenizing sheet, as shown in FIG. 22A, includes placing UV-curable epoxy 82 between a transparent master mold 50 and a substrate 212 coated with reflective coating 211. By exposing UV light, as shown in FIG. 22B, the reflective sheet 210, shown in FIG. 22C, is formed after being released from the mold. Alternatively, as illustrated in FIG. 23A-23C, a reflective light homogenizing sheet 210 can be molded by the following steps: (1) attaching mold 80(50) and flat mold 92 onto a mold die, having the ability to adjust stop distance between the molds upon molding, such that the mold stops are set so as to obtain substantially even thickness across the final molded optical sheet 210; (2) applying mold release 81 to the mold 80(50) and flat mold 92; (3) placing resin 83 or sheet 85 between the molds as in FIG. 23A; (4) pressing the die together with force and heat, as in FIG. 23B; (5) releasing pressure; (6) removing the optical sheet formed there between; and applying a reflective coating 213 to the flat side. This molding process is applicable to injection molding processes as well as compression molding, transfer molding, and sheet embossing processes as known in the art.

System

Figure 2:
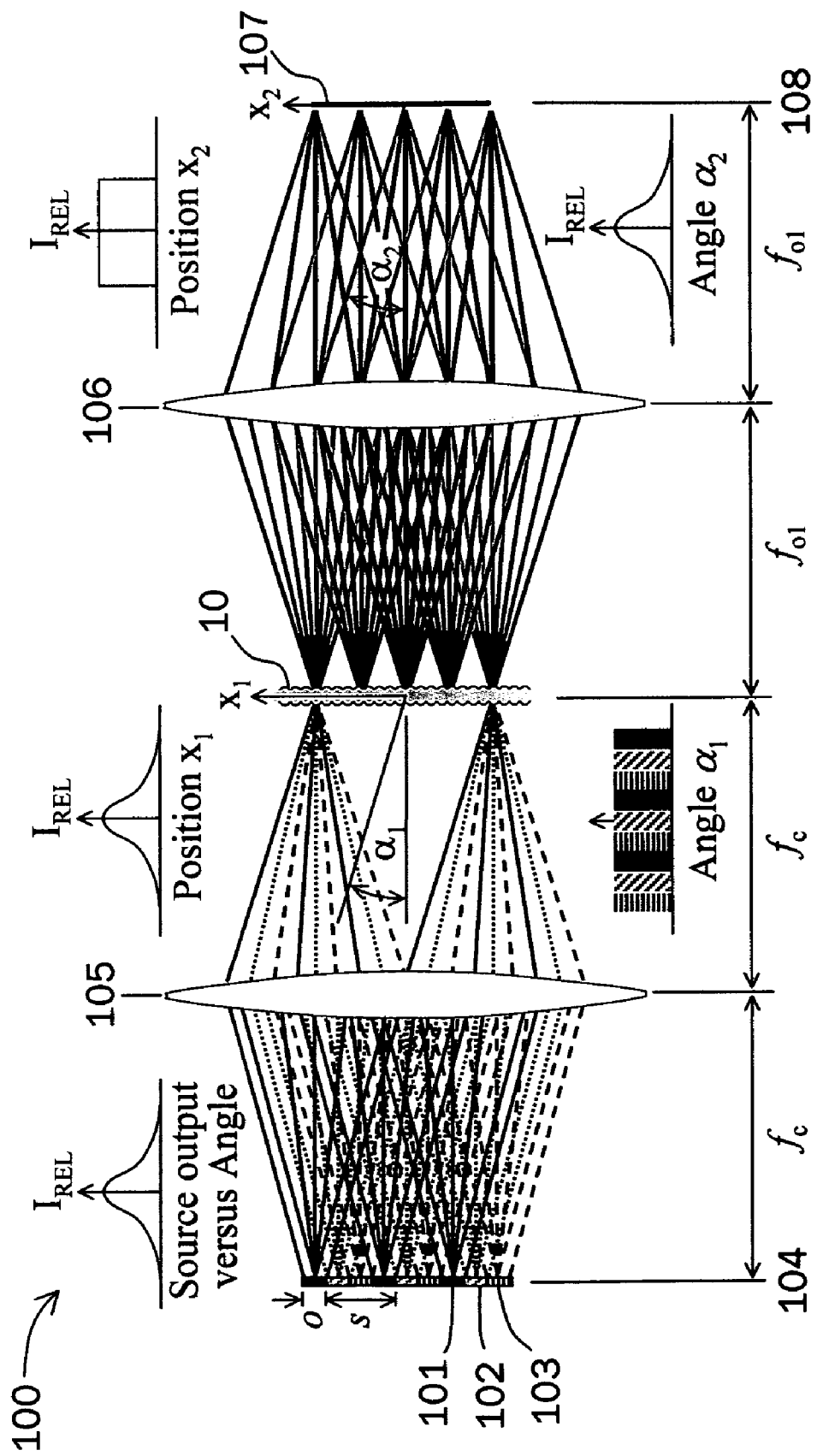
FIG. 2 illustrates an illumination system using one light homogenizing optical sheet with opposing microlens surfaces for providing uniform illumination versus position across an illuminated area.

Using the above described optical sheet 10, an illumination system 100 is provided as illustrated in FIG. 2. The system comprises the following: an array of one or more light-emitting sources 101(102)(103) at a source plane 104 tiled in a pattern substantially similar yet having pitch equal to or greater than the tiling pattern of the microlens array structure of the optical sheet 10, collimating optics system 105 having focal length $f_c$ to collimate said sources of the source array, one optical sheet 10, and imaging optics system 106 having focal length $f_{o1}$. The condensing optics system forms an area of uniform illumination versus position across the area 107 at an illumination plane 108 and can be substantially considered as Fourier Transforming optics. The illumination system 100 can allow uniform intensity output versus position across the illumination plane 108 within the area 107 defined by the homogenizing sheet design exit NA and the optic system focal length.

Figure 3:
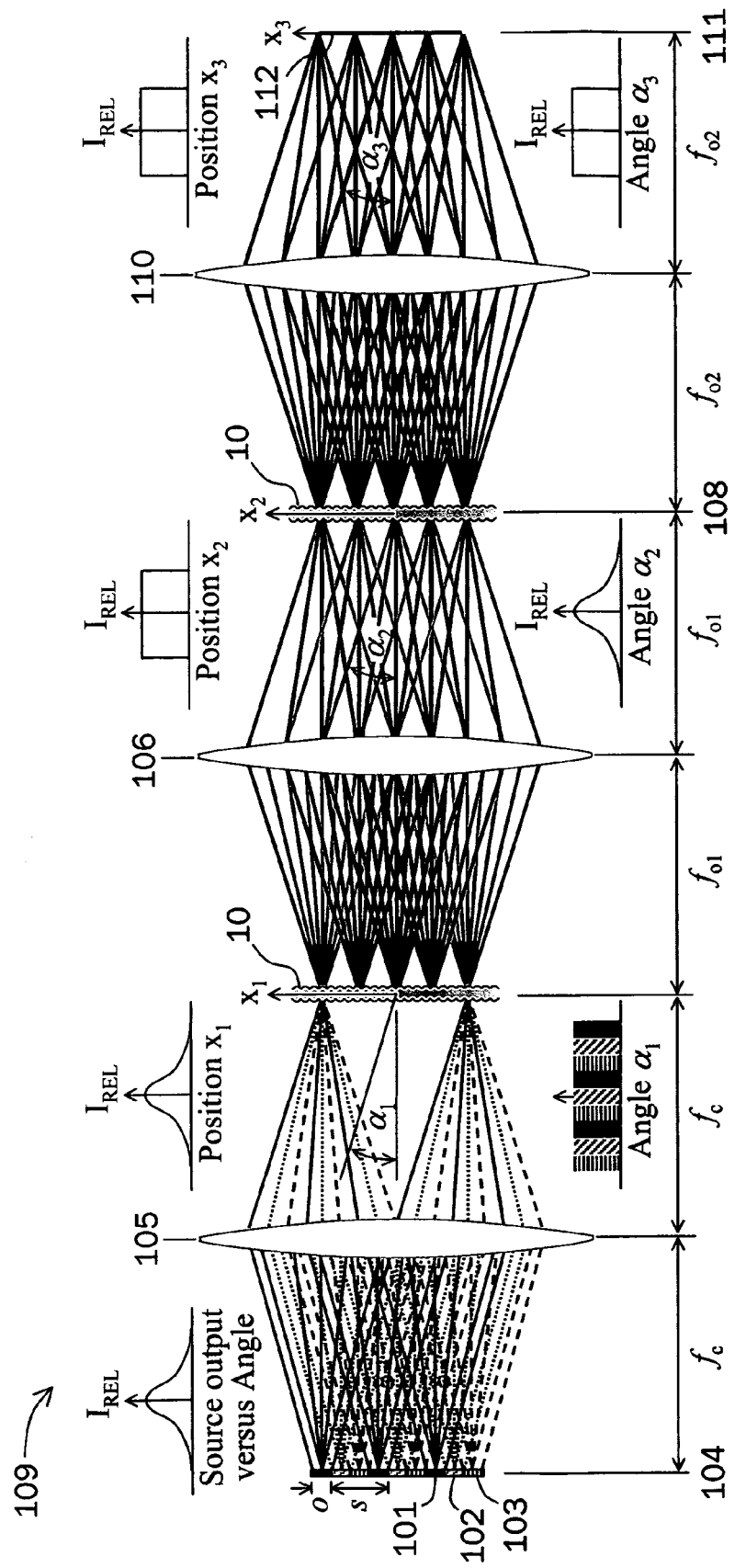
FIG. 3 illustrates an illumination system using two light homogenizing optical sheets for providing uniform illumination versus position across an illuminated area as well as versus angle within an illuminated area.

FIG. 3 illustrates an illumination system 109 that uses illumination system 100. By adding a subsequent optical sheet 10 at the illumination plane of illumination system 100, and a second condensing optical system 110 having focal length $f_{o2}$, the illumination system 109 can form uniform intensity output versus position across the illumination plane 111 within the illuminated area 112 as well as versus angle $\alpha_3$ within the illuminated area 112. The first optical sheet at plane $x_1$ creates a top-hat envelope versus angle within illumination area 112 while the second optical sheet forms a uniform top-hat profile at the illumination plane 111. Since the top-hat envelope profile versus angle within illumination plane 112 is formed by a projected image of the illuminated tilings across the second optical sheet and uniformity can be described by how well the input matches the acceptance angle of the sheet, optical sheets 10 having larger pitch tilings can allow more significant intensity fluctuations within the angular envelope. To limit or eliminate this effect, the source output profile versus angle can be forced to be a top-hat as by aperturing or other means, or alternatively, a third optical sheet 10 can be added either immediately after the source grid array or the source grid array can be imaged with additional optics into this additional optical sheet plane which would be placed at the plane 104.

Using the above described optical sheet 10, an illumination system 120 is provided as illustrated in FIG. 12A. The system 120 comprises the following: an array of one or more light-emitting sources 101(102) at source plane 104 tiled in a pattern substantially similar yet having pitch equal to or greater than the tiling pattern of the microlens array structure of the optical sheet 10, and one optical sheet 10. The system can allow uniform intensity output versus position across an illumination plane 121 within an illuminated area after the optical sheet 10.

FIG. 12B shows Flat Panel Matrix Display 122 that uses the illumination system 120. Further addition of an optics system 123, such as an ocular, that is capable of forming an Exit Pupil 124 having a display Field of View (FOV), as shown in FIG. 12(c), allows controlled Exit Pupils to be formed in a display system usable in a Helmet Mounted Display (HMD). Further addition of mirrored sidewalls 125, as shown in FIG. 12D, allows the light source usage efficiency to be increased while allowing the system to be made more compact. The present invention provides for an additional means for reducing the divergence, if needed, of said sources by individual lenses 126 or a single microlens array 127 with lenslet centers transversely aligned to the centers of the sources and can be added to the system, after the sources and before the first homogenizing sheet, for the purpose of increasing efficient usage of the light sources. Light-emitting sources 101(102)(103) include but are not limited to any sources of radiation such as LEDs, OLEDs, phosphors, halogen or incandescent or xenon or mercury high-pressure lamps, and light emitted from optical fibers or an array of optical fibers. The light sources are arranged in an array tiling pattern that substantially matches that of the homogenizing sheet array tiling in terms of tile shape, as illustrated in FIGS. 13A–13H; however, source array pitch must be equal to or larger than the pitch of the homogenizing sheet. The preferred pitch of the light source array can be described in relation to the propagation distance $z_1$, the distance between the light source array plane and the sheet plane, and also the angle $\theta_s$, as indicated in Eq. 13, $$\theta_s \geq \tan^{-1}\left[\frac{s_0 - o}{2z_1}\right] \quad (13$$

for $\theta_s$, minimum ripple angle of source
  $s_0$, pitch of light source array
  o, size of source emitter
  $z_1$, propagation distance between light source plane and sheet plane so that the range for the propagation distance becomes defined as in Eq. 14.

$$z_1 \geq \frac{s_0 - o}{2\tan[\theta_s]} \quad (14$$

The angle $\theta_s$ is dependent on the source angular output characteristics and represents the angle for which the uniformity at a plane at a distance $z_1$ exhibits a minimum ripple, or minimum fluctuation. It can be seen that various source types will exhibit different angular output characteristics such that the minimum angle to achieve minimum ripple will vary; for example, Gaussian sources will require the minimum ripple angle to be set substantially near the angle of half-maximum while Lambertian sources and sources having modified angular output, such as by use of a lens, will differ and have a $\theta_s$ defined based on minimum ripple at distance $z_1$. In addition, it must be noted that propagation distances greater than the minimum $z_1$ will typically yield improved uniformity at the sheet plane, particularly for integer multiple distances of $z_1$. Note also that the impact of source size o becomes negligible in the case that $s_0 \gg o$. A 2-dimensional matrix panel, such as an LCD display panel operating in transmissive mode, can then be placed at any plane beyond the sheet plane. It has been found that a non-zero propagation distance from the sheet is appropriate for improved uniformity at the panel plane. Further improvements can be seen in uniformity by increasing the separation distance $Z_2$ between the sheet plane and the panel plane as described in Eq. 15.

$$z_2 \geq \frac{s_0}{2\tan[\alpha]} \quad (15$$

for $\alpha$, acceptance angle of light homogenizing sheet
  $s_0$, pitch of light source array
  $z_2$, propagation distance between sheet plane and panel plane Further improvement in uniformity can be achieved, in particular, by use of integer multiple distances of $z_2$.

Figure 13H:
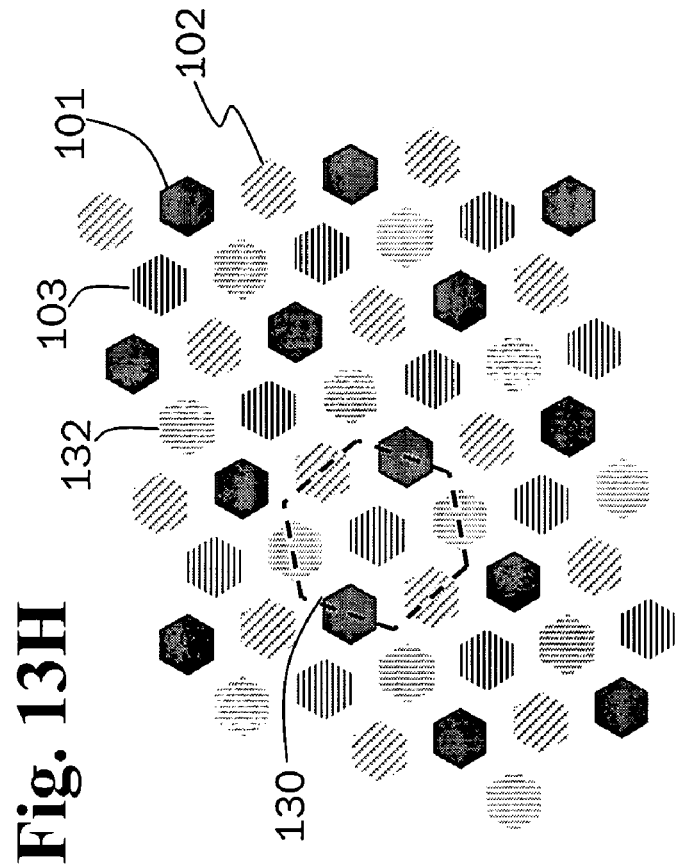
Figure 13G:
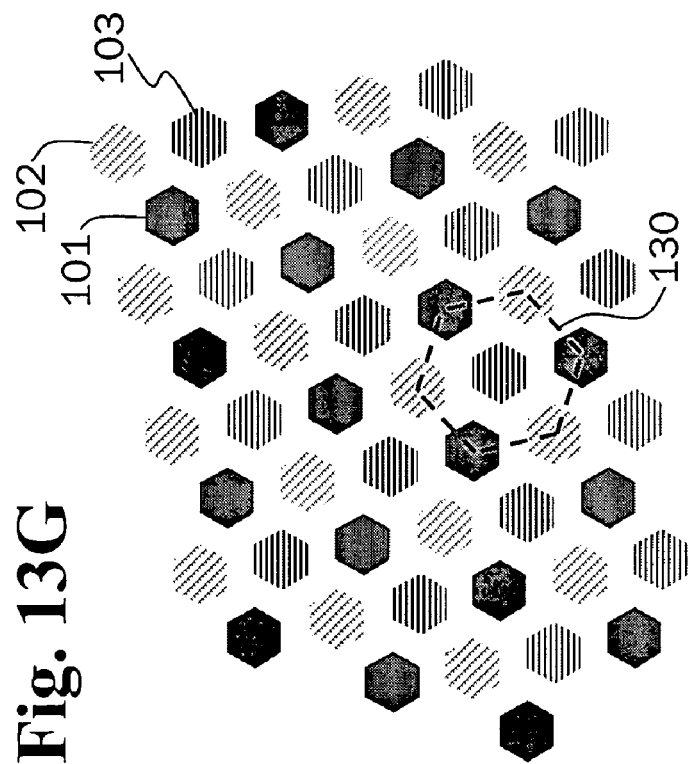

FIG. 13 illustrates various tiling patterns that can be used for tiling the source array. The source array should exhibit a tiling pattern similar to the tiling of the optical sheet in terms of tile shape, and light from the light-emitting sources 101 of size o having tiling spacing $s_0$, must be allowed to diverge or diffuse such that the gap between sources is filled smoothly, minimizing intensity ripple. FIG. 13A indicates a minimum spread area 130 which must be filled in order to minimize intensity fluctuation. Further improvement can be made by allowing the light to diverge and overlap adjacent diverging light, as shown in FIG. 13B as an overlapping area 131 having two times the source spacing. Typically, it is preferred that the overlap be substantially equal to integer multiples of the source spacing $s_0$ for optimum uniformity. Various exemplary tiling patterns along with each corresponding minimum spread area 130 are shown in FIG. 13C-H, including: rectangular with three source types in FIG. 13C; linear with three source types in FIG. 13D; square with three source types in FIG. 13E; square with four different types of sources in FIG. 13F; hexagonal with three source types in FIG. 13G; and hexagonal with four source types in FIG. 13H.

Figure 14A:
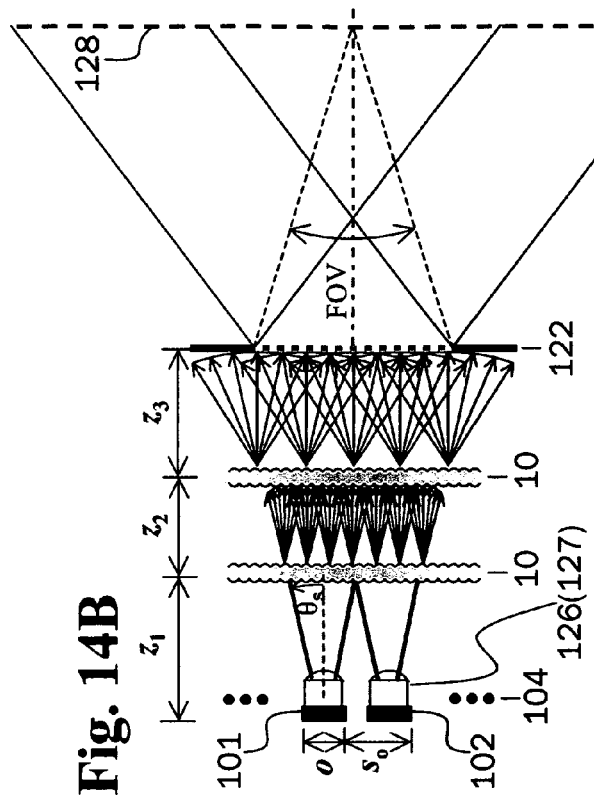
FIG. 14A is an illumination system comprised of an array of light sources and two light homogenizing sheets separated by a propagation distance.
Figure 14B:
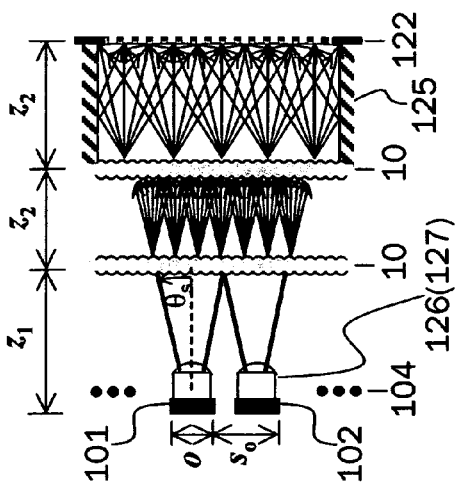
FIG. 14B is a display system comprised of an array of light sources, two light homogenizing sheets separated by a propagation distance, and a Flat Panel Matrix Display.
Figure 14C:
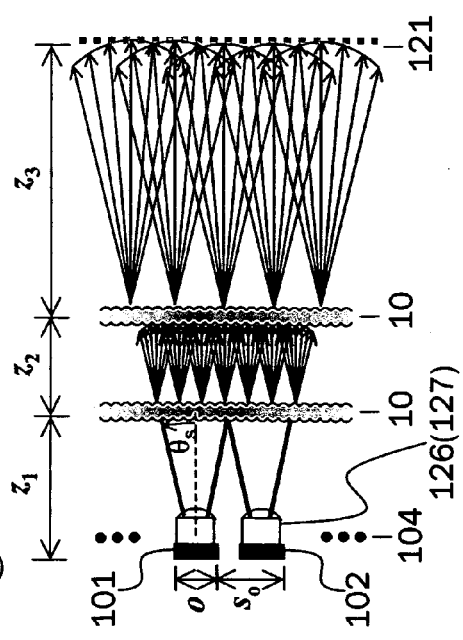
FIG. 14C is a display system comprised of an array of light sources, two light homogenizing sheets separated by a propagation distance, a Flat Panel Matrix Display, and Exit-Pupil-forming optics.
Figure 14D:
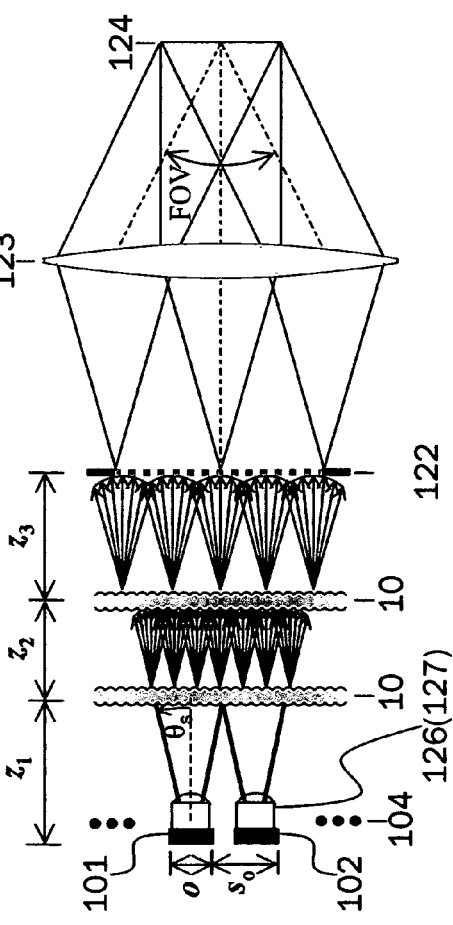
FIG. 14D illustrates a display module, such as those used in FIG. 14(b) & 14(c), that utilizes mirrored sidewalls to improve efficiency and compact size.

Although a uniform intensity versus position across a plane after the homogenizing optical sheet can be substantially achieved, use of two homogenizing sheets separated by a propagation distance can achieve uniformity at a plane after the last sheet across position as well as through angles within the exit Numerical Aperture exhibited by the sheet, as represented in FIG. 14A. FIG. 14B illustrates how a Flat Panel Matrix Display 122 can be added to form a display system using such illumination system to provide viewing of the Flat Panel Matrix Display at a viewing plane 128. Further addition of an optics system 123 that is capable of forming an Exit Pupil 124, as shown in FIG. 14C, allows controlled Exit Pupils to be formed in a display system usable in a Helmet Mounted Display (HMD). Further addition of mirrored sidewalls 125, as shown in FIG. 14D, allows the light source usage efficiency to be increased while allowing the system to be made more compact. High-performance direct display panel viewing applications, such as that shown in FIG. 14B, and HMD applications, such as that shown in FIG. 14C, may benefit from the uniformity enhancement versus angle as well as uniformity versus position within the illumination area at such an illumination plane 121, which would serve as the display panel plane. In this embodiment, the source array plane 104 and the first light homogenizing optical sheet 10 may be contiguous or have non-zero spacing $z_1$. In the contiguous case, wherein the panel plane immediately follows the source array plane, the first optical sheet 10 distributes the light from the sources evenly across the acceptance angle of the sheet, forming an improved uniformity at a further plane where a second homogenizing sheet is placed, after the light has propagated by a value $Z_2$, as similarly described in Eq. 15. The second sheet acts to further improve uniformity in terms of viewing angle as well as position across the display panel plane, located after a propagation distance of $Z_3$ from the second sheet. It is the addition of the second optical sheet 10 that allows the uniformity of the illumination plane, at the panel plane, to be uniform across position within the panel as well as across all viewing angles within the acceptance angle of the homogenizing sheet.

A tailored light homogenizing optical sheet 140, having cross-section as illustrated in FIG. 15A, exhibits an exit cone angle dependent on position across the sheet, having a first microlens array surface on the first side of the sheet and a second microlens array surface having non-equal pitch, $d_1$ and $d_2$, as compared to the first microlens array surface pitch, such that the lenslet centers of both first and second surfaces are aligned substantially near the center of the active sheet, yet lenslet centers near the edge of the active sheet exhibit transverse offsets $h_0$ of up to one lenslet spacing. As illustrated in the illumination system 150 in FIG. 16A, by tailoring the pitch of the microlens array surfaces of the light homogenizing optical sheet, the directionality of the exit NAs for positions across the sheet can be varied. This is a useful feature in applications such as direct view panel displays, such as in FIG. 16B, in that the efficient exit Numerical Apertures can be designed to overlap at a viewing plane 128 beyond the sheet. Such a display system can be comprised of: one or more light sources aligned in an array tiling having pitch; at least one tailored light homogenizing optical sheet; a plane or surface for a Flat Panel Display 122, such as a transmissive LCD panel or a reflective FPD (Flat Panel Display); and a defined viewing plane 128. In addition, a display system can be comprised of: one or more light sources aligned in an array tiling having pitch; at least one light homogenizing optical light 10; at least one tailored light homogenizing optical sheet 140; a plane for a display panel 122; and a defined viewing plane 128, as shown in FIG. 16C. By using the concept of slightly different microlens array pitch between front and back surface microlens arrays, a tailored homogenizing optical sheet can allow for higher efficiency of the source array by efficiently forcing all exit cones or exit Numerical Apertures to substantially overlap at a plane of viewing such that the full Field-of-View FOV can be seen within the entire exit Numerical Aperture exhibited by the sheet.

In addition to the tailored optical sheet of FIG. 15A, a tailored optical sheet can be comprised of two opposing microlens arrays surfaces of substantially equal pitch, but with a substantially consistent transverse offset $h_0$ across the sheet, such that all exit cones, or exit NAs from the optical sheet are redirected by a given steering angle, as shown in FIG. 15B. Such sheet can be used to steer the Exit Pupil 124 or viewing area 128 to a transverse offset position, if used in such systems as those in FIG. 12, FIG. 14 and FIG. 16 in place of the optical sheet 10. It should be noted that a variety of combinations of exit cone steering versus position across the sheet are possible. By using an illumination system having a tailored optical sheet along within an Exit-Pupil-forming optical system 123, the z-axis placement of the Exit Pupil plane 124 within the display system can be shifted by a relative distance $Z_{ep}$ to a new z-shifted Exit Pupil plane 129, which can be positive or negative depending on the relative pitch of the second microlens surface of the tailored optical sheet 140 as compared to the front surface microlens pitch, as shown in FIG. 16D. By using a tailored optical sheet in such systems, the working distance $w_{ep}$ can be increased to allow for more eye relief distance from the last optic element in the system to the Exit Pupil 129(124), where the viewer's eye pupil is placed for viewing, while maintaining high system efficiency.

Figure 20:
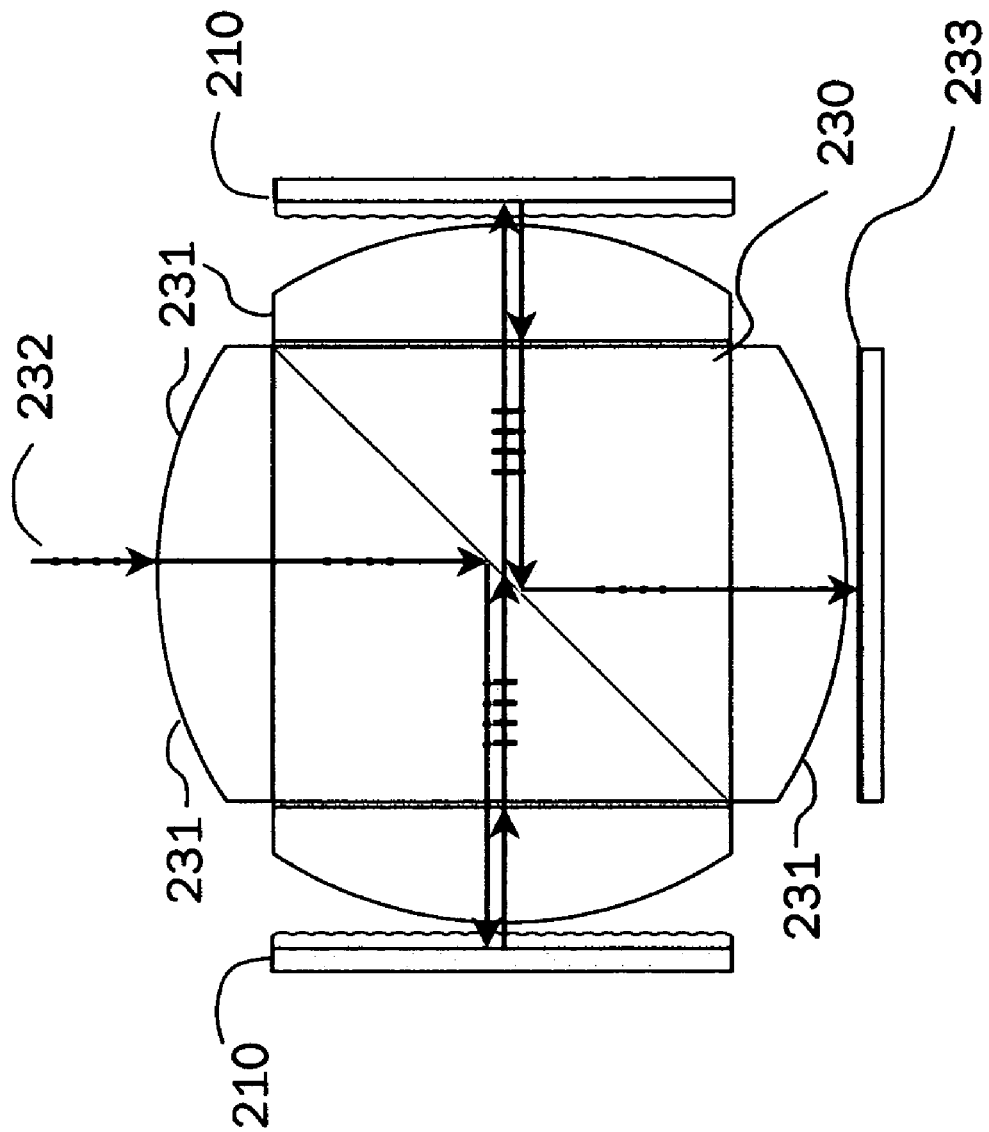
FIG. 20 is a reflective illumination system using two reflective light homogenizers.

A reflective light homogenizing sheet can be used in a reflective illumination system as shown in FIG. 20, such that input polarized light 232 is imaged through a 3-focal length system having lenses 231 with light path being: reflected by a polarizing beamsplitter 230; polarization rotated and reflected by a first reflective light homogenizer; subsequently polarization rotated and reflected by a subsequent reflective light homogenizer; and then reflected by the polarization beamsplitter into a uniform output plane 233 both uniform versus position as well as versus angle.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. An illumination system comprising: an array of one or more light-emitting sources located in a source plane; a first optical sheet, separated from the source array by a first propagation distance; a first illumination plane separated from said first optical sheet by a second propagation distance; a second optical sheet located at said first illumination plane; and a second illumination plane separated from said first illumination plane, so as to provide substantially uniform intensity output profile, within the illuminated area, versus position across said first illumination plane and to provide substantially uniform intensity output profile versus position across said second illumination plane as well as versus angle within the illuminated area of said second illumination plane, wherein the said optical sheets are light homogenizing optical sheets, each comprising a substantially constant thickness sheet made of transparent material with front and back surfaces, each said front and back surface including a microlens array formed thereon, said microlens array each including a plurality of non-hemispherical microlenses each aligned and registered with a non-hemispherical microlens on an opposite said front and back surfaces, said optical sheet having a sufficient thickness so that said microlenses on opposite said front and back surfaces are separated by a distance substantially equal to the focal length of said microlenses.

2. The illumination system as recited in claim 1, wherein at least one optical sheet is a tailored optical sheet, wherein the aligned and registered microlens arrays on said front and back surfaces have non-equal pitch, such that exit cones angles are dependent on position across the optical sheet and are allowed to overlap substantially at an illumination plane.

3. The illumination system as recited in claim 1, wherein at least one optical sheet is a tailored optical sheet, wherein the registered microlens arrays on said front and back surfaces have equal pitch and are transversely aligned, such that exit cones angles exhibit a constant, yet non-normal, exiting angle versus position across the optical sheet.

4. The illumination system as recited in claim 1, further including: an optical system disposed between said source plane and said first optical sheet so as to collimate said sources of the source array; an optical system disposed between said first optical sheet and said second optical sheet so as to condense a substantially top-hat intensity profile versus position across the plane of said second optical sheet;

and an optical system disposed between said second optical sheet and said second illumination plane so as to provide a substantially top-hat intensity profile versus position across said second illumination plane, as well as versus angle $\alpha_3$ within the illuminated area.

5. The illumination system as recited in claim 4 wherein the tiling patterns of the first light homogenizing optical sheet and the second light homogenizing optical sheet are not the same, such that a uniform top-hat intensity profile exhibiting x/y plane shape due to the tiling pattern of the light homogenizing sheet in plane $x_2$ is formed at plane $x_3$, while the output exit cone shape emanating from plane $x_3$ exhibits shape due to the tiling pattern of the light homogenizing sheet in plane $x_1$.

* * * * *